US012675366B2

(12) United States Patent
Gladwin et al.

(10) Patent No.: US 12,675,366 B2
(45) Date of Patent: *Jul. 7, 2026

(54) RECOVERING DATA FROM DE-SEQUENCED ENCODED DATA SLICES

(71) Applicant: Pure Storage, Inc., Santa Clara, CA (US)

(72) Inventors: S. Christopher Gladwin, Chicago, IL (US); Chuck Wilson Templeton, Chicago, IL (US); Jason K. Resch, Warwick, RI (US); Gary W. Grube, Barrington Hills, IL (US)

(73) Assignee: Pure Storage, Inc., Santa Clara, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 18/808,433

(22) Filed: Aug. 19, 2024

(65) Prior Publication Data

US 2024/0411939 A1 Dec. 12, 2024

Related U.S. Application Data

(63) Continuation of application No. 18/218,705, filed on Jul. 6, 2023, now Pat. No. 12,079,380, which is a
(Continued)

(51) Int. Cl.
*G06F 11/10* (2006.01)
*G06F 3/06* (2006.01)
(Continued)

(52) U.S. Cl.
CPC ........ *G06F 11/1076* (2013.01); *G06F 3/0619* (2013.01); *G06F 3/0647* (2013.01);
(Continued)

(58) Field of Classification Search
CPC ...... G06F 21/85; G06F 3/0619; G06F 3/0647; G06F 3/067; G06F 11/1076; G06F 21/72;
(Continued)

(56) References Cited

U.S. PATENT DOCUMENTS 4,092,732 A 5/1978 Ouchi
4,855,584 A 8/1989 Tomiyama
(Continued)

OTHER PUBLICATIONS

Aschenbrenner et al., Infrastructure for Interactivity—Decoupled Systems on the Loose, 2009, IEEE.
(Continued)

*Primary Examiner* — Steve N Nguyen
(74) *Attorney, Agent, or Firm* — Katz Ruby & Carle LLP; Katherine C. Stuckman; Bruce E. Stuckman

(57) ABSTRACT

A method for execution by one or more computing devices of a storage network, the method includes de-selecting a sequence of input encoded data slices based on de-selection information to produce deselected encoded data slices of a set of encoded data slices, where the input encoded data slices include a set of encoded data slices interspersed with a set of auxiliary data slices. The method further includes error decoding at least a decode threshold number of encoded data slices of the deselected encoded data slices in accordance with error decoding parameters to reproduce a data segment. The method further includes outputting the data segment to a requesting computing device of the storage network.

20 Claims, 29 Drawing Sheets

Related U.S. Application Data continuation of application No. 17/663,926, filed on May 18, 2022, now Pat. No. 11,734,463, which is a continuation of application No. 17/247,424, filed on Dec. 10, 2020, now Pat. No. 11,366,939, which is a continuation of application No. 16/201,878, filed on Nov. 27, 2018, now Pat. No. 10,891,400, which is a continuation-in-part of application No. 14/452,182, filed on Aug. 5, 2014, now Pat. No. 10,282,564, which is a continuation of application No. 12/954, 880, filed on Nov. 28, 2010, now Pat. No. 8,959,366.

(60) Provisional application No. 61/299,245, filed on Jan. 28, 2010.

(51) Int. Cl.

| | |
|---|---|
| *G06F 21/72* | (2013.01) |
| *G06F 21/80* | (2013.01) |
| *G06F 21/85* | (2013.01) |
| *H04L 9/32* | (2006.01) |
| *H04L 67/1097* | (2022.01) |
| *H04N 21/222* | (2011.01) |
| *H04N 21/2347* | (2011.01) |
| *H04N 21/845* | (2011.01) |
| *H04W 12/033* | (2021.01) |
| *H04L 65/75* | (2022.01) |
| *H04W 12/02* | (2009.01) |

(52) U.S. Cl.
CPC ............. *G06F 3/067* (2013.01); *G06F 21/72* (2013.01); *G06F 21/80* (2013.01); *G06F 21/85* (2013.01); *H04L 9/3242* (2013.01); *H04L 67/1097* (2013.01); *H04N 21/222* (2013.01); *H04N 21/2347* (2013.01); *H04N 21/8456* (2013.01); *H04W 12/033* (2021.01); *G06F 11/1008* (2013.01); *G06F 2211/1028* (2013.01); *G06F 2221/2107* (2013.01); *H04L 65/764* (2022.05); *H04W 12/02* (2013.01)

(58) Field of Classification Search
CPC ................. G06F 21/80; G06F 11/1008; G06F 2211/1028; G06F 2221/2107; H04L 9/3242; H04L 67/1097; H04L 65/764; H04N 21/222; H04N 21/2347; H04N 21/8456; H04W 12/033; H04W 12/02
See application file for complete search history.

(56) References Cited

U.S. PATENT DOCUMENTS

| | | | |
|---|---|---|---|
| 5,361,323 A | 11/1994 | Murata | |
| 5,454,101 A | 9/1995 | Mackay | |
| 5,485,474 A | 1/1996 | Rabin | |
| 5,535,239 A | 7/1996 | Padovani | |
| 5,613,001 A | 3/1997 | Bakhoum | |
| 5,621,799 A | 4/1997 | Katta | |
| 5,774,643 A | 6/1998 | Lubbers | |
| 5,793,885 A * | 8/1998 | Kasson | G06T 5/20 |
| | | | 382/167 |
| 5,802,364 A | 9/1998 | Senator | |
| 5,809,285 A | 9/1998 | Hilland | |
| 5,890,156 A | 3/1999 | Rekieta | |
| 5,910,182 A | 6/1999 | Dent | |
| 5,983,385 A * | 11/1999 | Khayrallah | H03M 13/6561 |
| | | | 714/787 |
| 5,987,622 A | 11/1999 | Lo Verso | |
| 5,991,414 A | 11/1999 | Garay | |
| 6,012,159 A | 1/2000 | Fischer | |
| 6,058,454 A | 5/2000 | Gerlach | |
| 6,128,277 A | 10/2000 | Bruck | |
| 6,175,571 B1 | 1/2001 | Haddock | |
| 6,192,472 B1 | 2/2001 | Garay | |
| 6,256,688 B1 | 7/2001 | Suetaka | |
| 6,272,658 B1 | 8/2001 | Steele | |
| 6,301,558 B1 * | 10/2001 | Isozaki | H04L 1/0083 |
| | | | 704/229 |
| 6,301,604 B1 | 10/2001 | Nojima | |
| 6,356,949 B1 | 3/2002 | Katsandres | |
| 6,366,995 B1 | 4/2002 | Nikolaevich | |
| 6,374,336 B1 | 4/2002 | Peters | |
| 6,415,373 B1 | 7/2002 | Peters | |
| 6,418,539 B1 | 7/2002 | Walker | |
| 6,449,688 B1 | 9/2002 | Peters | |
| 6,567,948 B2 | 5/2003 | Steele | |
| 6,571,212 B1 | 5/2003 | Dent | |
| 6,571,282 B1 | 5/2003 | Bowman-Amuah | |
| 6,609,223 B1 | 8/2003 | Wolfgang | |
| 6,668,325 B1 | 12/2003 | Collberg | |
| 6,678,828 B1 | 1/2004 | Pham | |
| 6,690,795 B1 | 2/2004 | Richards | |
| 6,718,361 B1 | 4/2004 | Basani | |
| 6,760,808 B2 | 7/2004 | Peters | |
| 6,785,768 B2 | 8/2004 | Peters | |
| 6,785,783 B2 | 8/2004 | Buckland | |
| 6,826,711 B2 | 11/2004 | Moulton | |
| 6,879,596 B1 | 4/2005 | Dooply | |
| 6,981,217 B1 | 12/2005 | Knauft | |
| 7,003,688 B1 | 2/2006 | Pittelkow | |
| 7,024,451 B2 | 4/2006 | Jorgenson | |
| 7,024,609 B2 | 4/2006 | Wolfgang | |
| 7,080,101 B1 | 7/2006 | Watson | |
| 7,103,824 B2 | 9/2006 | Halford | |
| 7,103,915 B2 | 9/2006 | Redlich | |
| 7,111,115 B2 | 9/2006 | Peters | |
| 7,140,044 B2 | 11/2006 | Redlich | |
| 7,146,644 B2 | 12/2006 | Redlich | |
| 7,171,493 B2 | 1/2007 | Shu | |
| 7,222,133 B1 | 5/2007 | Raipurkar | |
| 7,240,236 B2 | 7/2007 | Cutts | |
| 7,272,602 B2 | 9/2007 | Moulton | |
| 7,272,613 B2 | 9/2007 | Sim | |
| 7,406,595 B1 | 7/2008 | Boyle | |
| 7,457,415 B2 | 11/2008 | Reitmeier | |
| 7,472,334 B1 | 12/2008 | Scott | |
| 7,478,316 B2 | 1/2009 | Koppich | |
| 7,509,390 B1 | 3/2009 | Raman | |
| 7,509,420 B2 | 3/2009 | Moulton | |
| 7,577,689 B1 | 8/2009 | Masinter | |
| 7,636,724 B2 * | 12/2009 | de la Torre | G06F 11/1076 |
| | | | 707/999.102 |
| 7,707,645 B2 | 4/2010 | Haruki | |
| 7,991,746 B2 | 8/2011 | Krishnaiyer | |
| 8,275,132 B2 | 9/2012 | Buchen | |
| 8,392,474 B2 | 3/2013 | Franco | |
| 8,522,125 B1 | 8/2013 | Feng | |
| 8,560,930 B2 | 10/2013 | Li | |
| 8,626,820 B1 | 1/2014 | Levy | |
| 8,649,521 B2 | 2/2014 | Grube | |
| 8,677,214 B2 | 3/2014 | Grube | |
| 8,744,071 B2 | 6/2014 | Leggette | |
| 8,782,494 B2 | 7/2014 | Grube | |
| 8,856,617 B2 | 10/2014 | Grube | |
| 8,885,821 B2 | 11/2014 | Grube | |
| 8,904,080 B2 | 12/2014 | Martin | |
| 8,918,897 B2 | 12/2014 | Resch | |
| 8,959,336 B1 | 2/2015 | Lee | |
| 8,959,366 B2 | 2/2015 | Grube | |
| 9,015,301 B2 | 4/2015 | Redlich | |
| 9,021,263 B2 | 4/2015 | Resch | |
| 9,076,138 B2 | 7/2015 | Resch | |
| 9,128,870 B2 | 9/2015 | Grube | |
| 9,135,456 B2 | 9/2015 | O'Hare | |
| 9,246,515 B2 * | 1/2016 | Kong | G06F 11/10 |
| 9,854,331 B2 | 12/2017 | Winograd | |
| 9,854,332 B2 | 12/2017 | Winograd | |
| 10,282,564 B2 | 5/2019 | Gladwin | |
| 10,891,400 B2 | 1/2021 | Gladwin | |
| 11,366,939 B1 | 6/2022 | Gladwin | |
| 2002/0002675 A1 | 1/2002 | Bush | |

(56) References Cited

U.S. PATENT DOCUMENTS

| | | | |
|---|---|---|---|
| 2002/0003881 A1 | 1/2002 | Reitmeier | |
| 2002/0046359 A1 | 4/2002 | Boden | |
| 2002/0062422 A1 | 5/2002 | Butterworth | |
| 2002/0078227 A1 | 6/2002 | Kronenberg | |
| 2002/0095590 A1 | 7/2002 | Douceur | |
| 2002/0140991 A1* | 10/2002 | Li | H03M 13/03 |
| | | | 358/426.13 |
| 2002/0166079 A1 | 11/2002 | Ulrich | |
| 2002/0194570 A1 | 12/2002 | Birru | |
| 2003/0002665 A1 | 1/2003 | Sako | |
| 2003/0012372 A1 | 1/2003 | Cheng | |
| 2003/0018927 A1 | 1/2003 | Gadir | |
| 2003/0028879 A1 | 2/2003 | Gordon | |
| 2003/0037261 A1 | 2/2003 | Meffert | |
| 2003/0065617 A1 | 4/2003 | Watkins | |
| 2003/0084020 A1 | 5/2003 | Shu | |
| 2003/0123664 A1 | 7/2003 | Pedlow | |
| 2004/0008794 A1* | 1/2004 | McClellan | H04L 25/4917 |
| | | | 375/353 |
| 2004/0012486 A1 | 1/2004 | Mani | |
| 2004/0015723 A1 | 1/2004 | Pham | |
| 2004/0015724 A1 | 1/2004 | Pham | |
| 2004/0024963 A1 | 2/2004 | Talagala | |
| 2004/0052378 A1* | 3/2004 | Shiragami | H04L 9/083 |
| | | | 380/277 |
| 2004/0062307 A1* | 4/2004 | Hallapuro | H04N 19/159 |
| | | | 375/240.16 |
| 2004/0117718 A1 | 6/2004 | Manasse | |
| 2004/0122917 A1 | 6/2004 | Menon | |
| 2004/0145661 A1 | 7/2004 | Murakami | |
| 2004/0172549 A1 | 9/2004 | Kojima | |
| 2004/0215998 A1 | 10/2004 | Buxton | |
| 2004/0228493 A1 | 11/2004 | Ma | |
| 2005/0002531 A1 | 1/2005 | Michaelsen | |
| 2005/0071659 A1 | 3/2005 | Ferguson | |
| 2005/0089234 A1 | 4/2005 | Base | |
| 2005/0100022 A1 | 5/2005 | Ramprashad | |
| 2005/0114594 A1 | 5/2005 | Corbett | |
| 2005/0123271 A1 | 6/2005 | Ichinose | |
| 2005/0125593 A1 | 6/2005 | Karpoff | |
| 2005/0131993 A1 | 6/2005 | Fatula, Jr. | |
| 2005/0132070 A1 | 6/2005 | Redlich | |
| 2005/0144283 A1 | 6/2005 | Fatula | |
| 2005/0144382 A1 | 6/2005 | Schmisseur | |
| 2005/0165972 A1 | 7/2005 | Miyata | |
| 2005/0229069 A1 | 10/2005 | Hassner | |
| 2005/0265349 A1 | 12/2005 | Garg | |
| 2006/0026295 A1 | 2/2006 | Iwamura | |
| 2006/0047907 A1 | 3/2006 | Shiga | |
| 2006/0056519 A1 | 3/2006 | Horowitz | |
| 2006/0069719 A1 | 3/2006 | McCanne | |
| 2006/0069964 A1 | 3/2006 | Hayashi | |
| 2006/0129801 A1 | 6/2006 | Kang | |
| 2006/0136448 A1 | 6/2006 | Cialini | |
| 2006/0156059 A1 | 7/2006 | Kitamura | |
| 2006/0177061 A1 | 8/2006 | Orsini | |
| 2006/0212782 A1 | 9/2006 | Li | |
| 2006/0224603 A1 | 10/2006 | Correll, Jr. | |
| 2006/0265436 A1 | 11/2006 | Edmond | |
| 2006/0281487 A1 | 12/2006 | Girardeau, Jr. | |
| 2007/0016802 A1 | 1/2007 | Wingert | |
| 2007/0067332 A1 | 3/2007 | Gallagher | |
| 2007/0079081 A1 | 4/2007 | Gladwin | |
| 2007/0079082 A1 | 4/2007 | Gladwin | |
| 2007/0079083 A1 | 4/2007 | Gladwin | |
| 2007/0088970 A1 | 4/2007 | Buxton | |
| 2007/0100913 A1 | 5/2007 | Sumner | |
| 2007/0118731 A1 | 5/2007 | Zizzi | |
| 2007/0150481 A1 | 6/2007 | Song | |
| 2007/0160198 A1 | 7/2007 | Orsini | |
| 2007/0168843 A1* | 7/2007 | Kanaoka | G11B 20/10009 |
| | | | 714/792 |
| 2007/0174192 A1 | 7/2007 | Gladwin | |
| 2007/0214285 A1 | 9/2007 | Au | |

| | | | |
|---|---|---|---|
| 2007/0226145 A1 | 9/2007 | Ishigaki | |
| 2007/0234110 A1 | 10/2007 | Soran | |
| 2007/0263864 A1 | 11/2007 | Buchen | |
| 2007/0266446 A1 | 11/2007 | Aaron | |
| 2007/0283167 A1 | 12/2007 | Venters | |
| 2007/0291940 A1 | 12/2007 | Candelore | |
| 2008/0010218 A1 | 1/2008 | Zank | |
| 2008/0049930 A1 | 2/2008 | You | |
| 2008/0126357 A1 | 5/2008 | Casanova | |
| 2008/0140724 A1 | 6/2008 | Flynn | |
| 2008/0147821 A1 | 6/2008 | Dietrich | |
| 2008/0183992 A1 | 7/2008 | Martin | |
| 2008/0192936 A1 | 8/2008 | Bellwood | |
| 2008/0222480 A1 | 9/2008 | Huang | |
| 2008/0222481 A1 | 9/2008 | Huang | |
| 2008/0244404 A1 | 10/2008 | Li | |
| 2008/0250296 A1* | 10/2008 | Borri | H03M 13/293 |
| | | | 714/758 |
| 2008/0263113 A1 | 10/2008 | Krishnaiyer | |
| 2008/0320151 A1 | 12/2008 | McCanne | |
| 2009/0041235 A1 | 2/2009 | Reitmeier | |
| 2009/0055547 A1 | 2/2009 | Hudson | |
| 2009/0063934 A1* | 3/2009 | Jo | G06F 11/1068 |
| | | | 714/764 |
| 2009/0094251 A1 | 4/2009 | Gladwin | |
| 2009/0094318 A1 | 4/2009 | Gladwin | |
| 2009/0119515 A1 | 5/2009 | Nicolson | |
| 2009/0125671 A1 | 5/2009 | Flynn | |
| 2009/0182934 A1* | 7/2009 | Kim | G11C 11/5671 |
| | | | 711/E12.008 |
| 2009/0287956 A1 | 11/2009 | Flynn | |
| 2010/0023524 A1 | 1/2010 | Gladwin | |
| 2010/0042583 A1 | 2/2010 | Gervais | |
| 2010/0135384 A1 | 6/2010 | Berkvens | |
| 2010/0172496 A1 | 7/2010 | Furukawa | |
| 2010/0199089 A1 | 8/2010 | Vysogorets | |
| 2010/0211737 A1 | 8/2010 | Flynn | |
| 2010/0250497 A1 | 9/2010 | Redlich | |
| 2010/0266122 A1 | 10/2010 | Suzaki | |
| 2010/0293440 A1 | 11/2010 | Thatcher | |
| 2011/0060887 A1 | 3/2011 | Thatcher et al. | |
| 2011/0106904 A1 | 5/2011 | Resch | |
| 2011/0145584 A1 | 6/2011 | Coburn | |
| 2011/0161754 A1 | 6/2011 | Baptist | |
| 2012/0011340 A1 | 1/2012 | Flynn | |
| 2012/0066517 A1 | 3/2012 | Vysogorets | |
| 2012/0066752 A1 | 3/2012 | Vysogorets | |
| 2012/0066756 A1 | 3/2012 | Vysogorets | |
| 2012/0066757 A1 | 3/2012 | Vysogorets et al. | |
| 2012/0198302 A1 | 8/2012 | Otterstedt | |
| 2012/0311403 A1 | 12/2012 | Gladwin | |
| 2014/0245063 A1 | 8/2014 | Baptist | |
| 2017/0031752 A1 | 2/2017 | Cilfone | |
| 2020/0042381 A1 | 2/2020 | Hegde | |

OTHER PUBLICATIONS

Bellare et al., Robust Computational Secret Sharing and a Unified Account of Classical Secret-Sharing Goals, Nov. 2007, ACM.
Bian, JigDFS: A Secure Distributed File System, 2009.
Chung; An Automatic Data Segmentation Method for 3D Measured Data Points; National Taiwan University; pp. 1-8; 1998.
Harrison; Lightweight Directory Access Protocol (LDAP): Authentication Methods and Security Mechanisms; IETF Network Working Group; RFC 4513; Jun. 2006; pp. 1-32.
Jensen et al., Resilia: a Safe and Secure Distributed Backup System for Small and Medium Enterprises, 2007, Springer.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.
Legg; Lightweight Directory Access Protocol (LDAP): Syntaxes and Matching Rules; IETF Network Working Group; RFC 4517; Jun. 2006; pp. 1-50.
Plank, T1: Erasure Codes for Storage Applications; FAST2005, 4th Usenix Conference on File Storage Technologies; Dec. 13-16, 2005; pp. 1-74.

(56)         References Cited

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Schuman et al., A Performance Comparison of Open-Source Erasure Coding Libraries for Storage Applications, Aug. 2008, University of Tennessee.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Storer et al., Long-Term Threats to Secure Archives, Oct. 2006, ACM.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

U.S. Appl. No. 61/221,762, filed Jun. 30, 2009; Leggette, et al.

U.S. Appl. No. 61/256,193, filed Oct. 29, 2009; Markison, et al.

* cited by examiner computing system 10 randomized slices 209

Figure 8B:
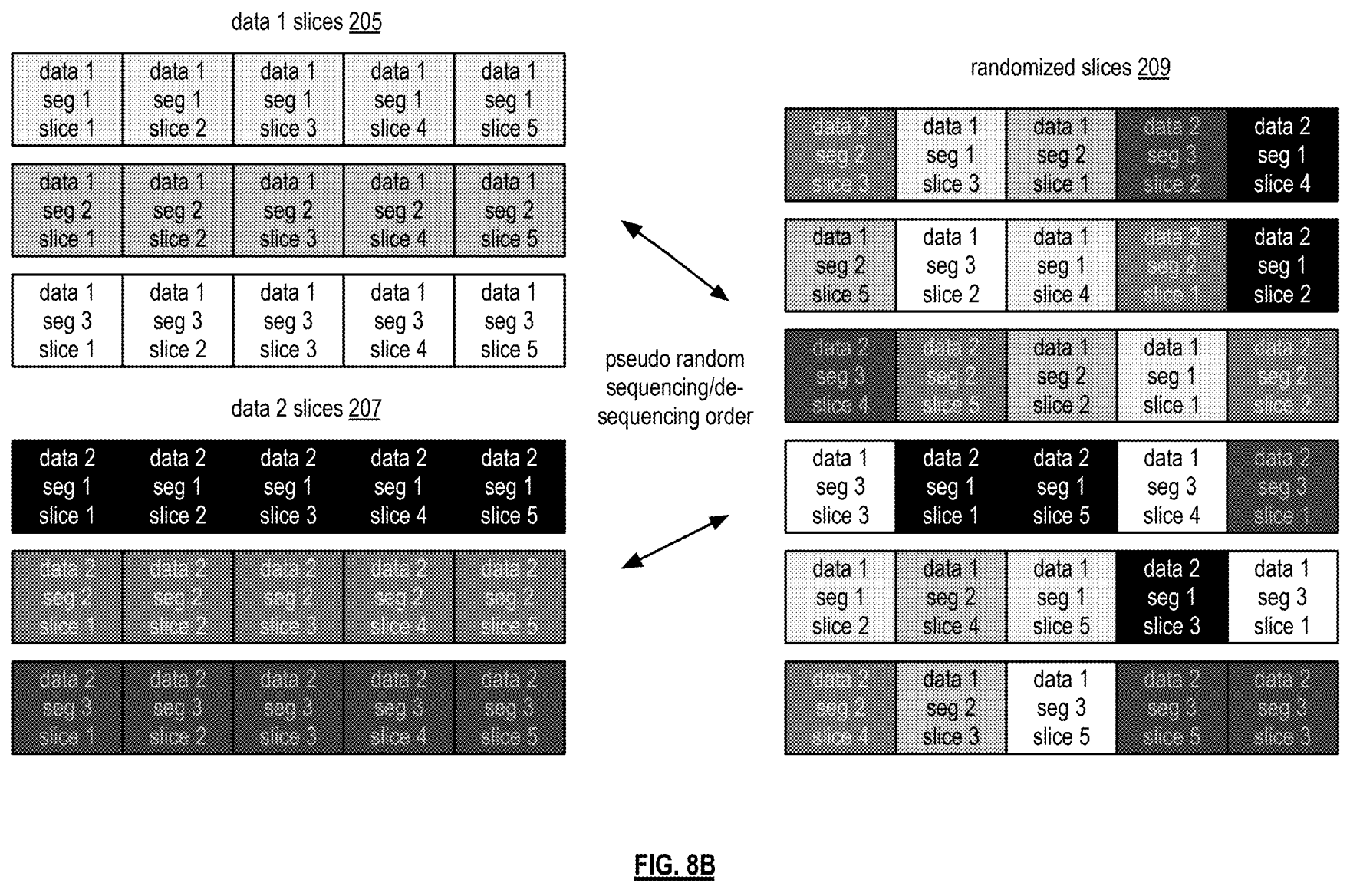

| data 1 seg 2 slice 4 | data 1 seg 1 slice 3 | data 1 seg 2 slice 1 | data 2 seg 3 slice 2 | data 2 seg 1 slice 4 |
| data 1 seg 2 slice 5 | data 1 seg 3 slice 2 | data 1 seg 1 slice 4 | data 2 seg 3 slice 1 | data 2 seg 1 slice 2 |
| data 2 seg 3 slice 4 | data 2 seg 3 slice 3 | data 1 seg 2 slice 2 | data 1 seg 1 slice 1 | data 2 seg 3 slice 1 |
| data 1 seg 3 slice 3 | data 2 seg 1 slice 1 | data 2 seg 1 slice 5 | data 2 seg 1 slice 3 | data 2 seg 3 slice 4 |
| data 1 seg 1 slice 2 | data 1 seg 2 slice 4 | data 1 seg 1 slice 5 | data 2 seg 1 slice 3 | data 1 seg 3 slice 4 |
| data 1 seg 2 slice 3 | data 1 seg 3 slice 5 | data 1 seg 3 slice 1 | data 2 seg 3 slice 5 | pseudo random
sequencing/de-
sequencing order data 1 slices 205 data 2 slices 207

FIG. 8B randomized slices 209 randomized segments of data 1 slices 205 randomized segments of data 2 slices 207 pseudo random sequencing/de-sequencing order

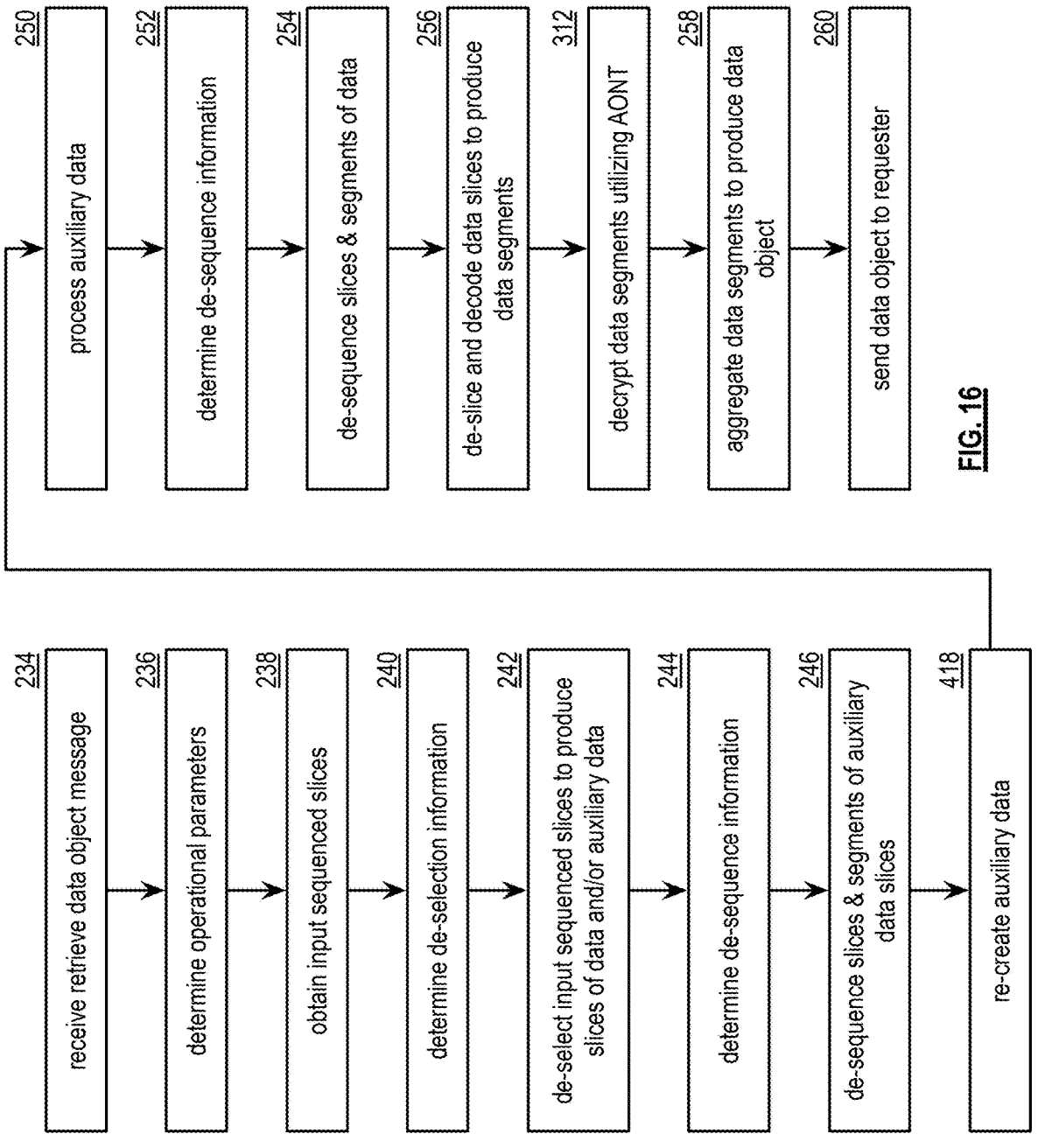

250 process auxiliary data 252 determine de-sequence information 254 de-sequence slices & segments of data 256 de-slice and decode data slices to produce data segments 312 decrypt data segments utilizing AONT 258 aggregate data segments to produce data object 260 send data object to requester 234 receive retrieve data object message 236 determine operational parameters 238 obtain input sequenced slices 240 determine de-selection information 242 de-select input sequenced slices to produce slices of data and/or auxiliary data 244 determine de-sequence information 246 de-sequence slices & segments of auxiliary data slices 418 re-create auxiliary data

FIG. 16

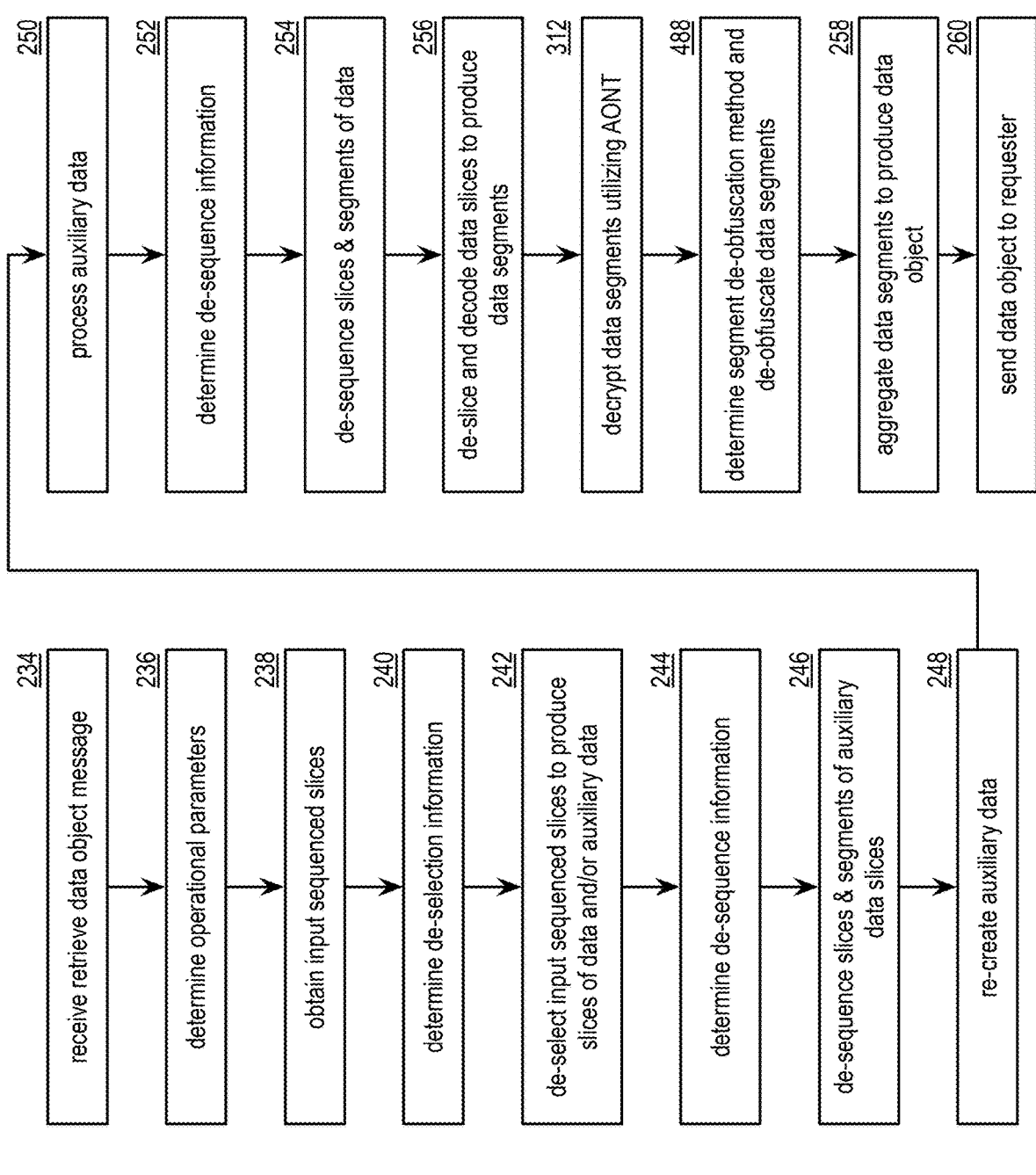

250 process auxiliary data 252 determine de-sequence information 254 de-sequence slices & segments of data 256 de-slice and decode data slices to produce data segments 312 decrypt data segments utilizing AONT 488 determine segment de-obfuscation method and de-obfuscate data segments 258 aggregate data segments to produce data object 260 send data object to requester 234 receive retrieve data object message 236 determine operational parameters 238 obtain input sequenced slices 240 determine de-selection information 242 de-select input sequenced slices to produce slices of data and/or auxiliary data 244 determine de-sequence information 246 de-sequence slices & segments of auxiliary data slices 248 re-create auxiliary data

FIG. 18

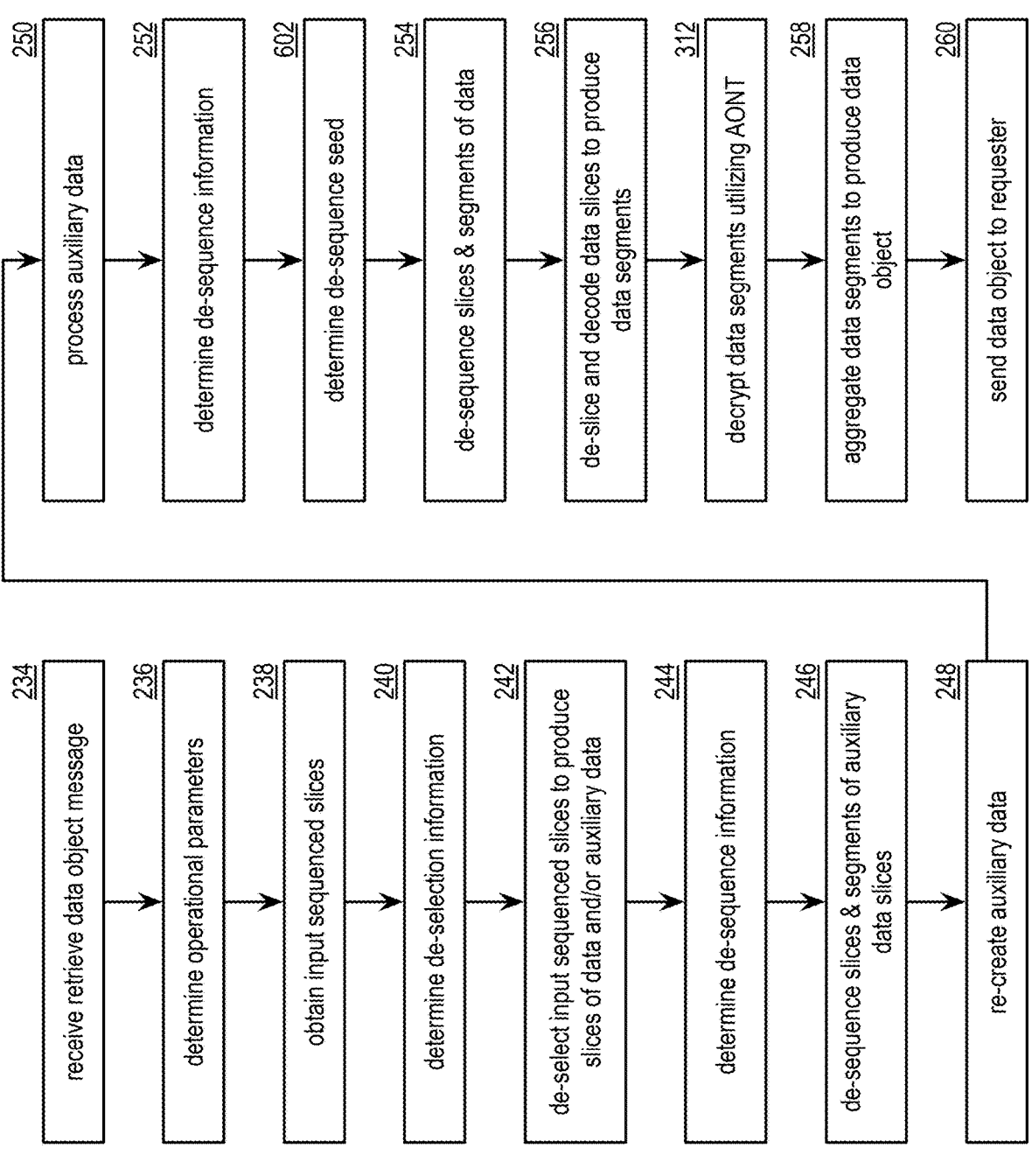

250 process auxiliary data 252 determine de-sequence information 602 determine de-sequence seed 254 de-sequence slices & segments of data 256 de-slice and decode data slices to produce data segments 312 decrypt data segments utilizing AONT 258 aggregate data segments to produce data object 260 send data object to requester 234 receive retrieve data object message 236 determine operational parameters 238 obtain input sequenced slices 240 determine de-selection information 242 de-select input sequenced slices to produce slices of data and/or auxiliary data 244 determine de-sequence information 246 de-sequence slices & segments of auxiliary data slices 248 re-create auxiliary data

FIG. 22

RECOVERING DATA FROM DE-SEQUENCED ENCODED DATA SLICES

CROSS REFERENCE TO RELATED PATENTS

This application claims priority pursuant to 35 U.S.C. § 120 as a continuation of U.S. Utility application Ser. No. 18/218,705, entitled "RECOVERING DATA FROM ENCODED DATA SLICES INTERSPERSED WITH AUXILIARY DATA," filed Jul. 6, 2023, which is a continuation of U.S. Utility application Ser. No. 17/663,926, entitled "OBFUSCATING A SET OF ENCODED DATA SLICES," filed May 18, 2022, issued as U.S. Pat. No. 11,734,463 on Aug. 22, 2023, which is a continuation of U.S. Utility application Ser. No. 17/247,424, entitled "SECURE DATA TRANSMISSION UTILIZING A SET OF OBFUSCATED ENCODED DATA SLICES," filed Dec. 10, 2020, issued as U.S. Pat. No. 11,366,939 on Jun. 21, 2022, which is a continuation of U.S. Utility application Ser. No. 16/201,878, entitled "SECURE DATA TRANSMISSION UTILIZING DISTRIBUTED STORAGE," filed Nov. 27, 2018, issued as U.S. Pat. No. 10,891,400 on Jan. 12, 2021, which is a continuation-in-part of U.S. Utility application Ser. No. 14/452,182, entitled "DISTRIBUTED STORAGE WITH AUXILIARY DATA INTERSPERSAL AND METHOD FOR USE THEREWITH," filed Aug. 5, 2014, issued as U.S. Pat. No. 10,282,564 on May 7, 2019, which is a continuation of U.S. Utility application Ser. No. 12/954,880, entitled "DE-SEQUENCING ENCODED DATA SLICES," filed Nov. 28, 2010, issued as U.S. Pat. No. 8,959,366 on Feb. 17, 2015, which claims priority pursuant to 35 U.S.C. § 119 (e) to U.S. Provisional Application No. 61/299,245, entitled "SECURE DATA TRANSMISSION UTILIZING DISTRIBUTED STORAGE," filed Jan. 28, 2010, expired, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIGS. 8B-8E are diagrams illustrating examples of sequencing and selecting encoded data slices in accordance with the invention;

FIG. 16 is a flowchart illustrating another example of decoding encoded data slices to produce data in accordance with the invention;

FIG. 18 is a flowchart illustrating another example of decoding encoded data slices to produce data in accordance with the invention;

FIG. 22 is a flowchart illustrating another example of decoding encoded data slices to produce data in accordance with the invention;

DETAILED DESCRIPTION OF THE INVENTION

Figure 1:
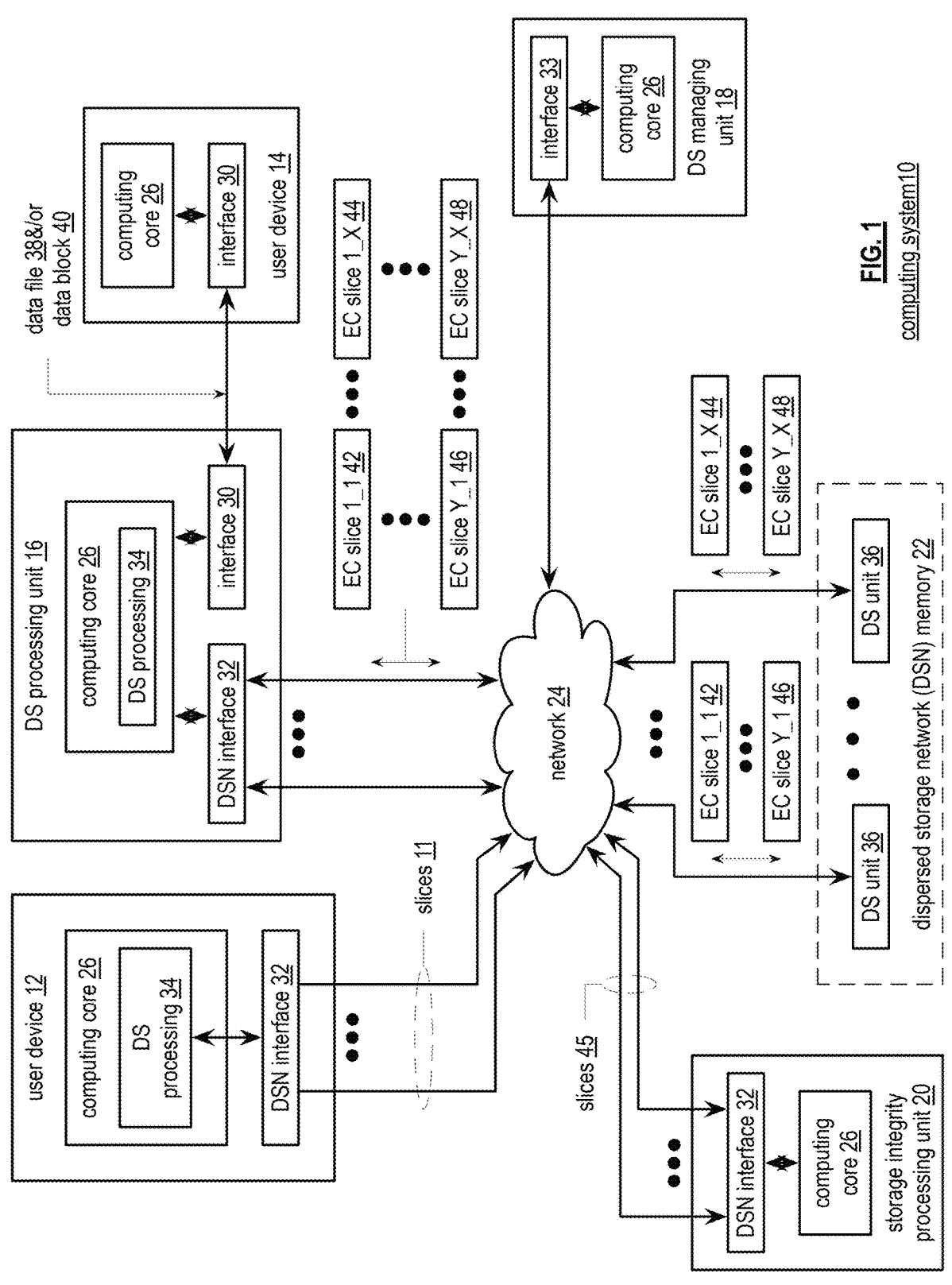
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-26.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices

12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (ISCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-26.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
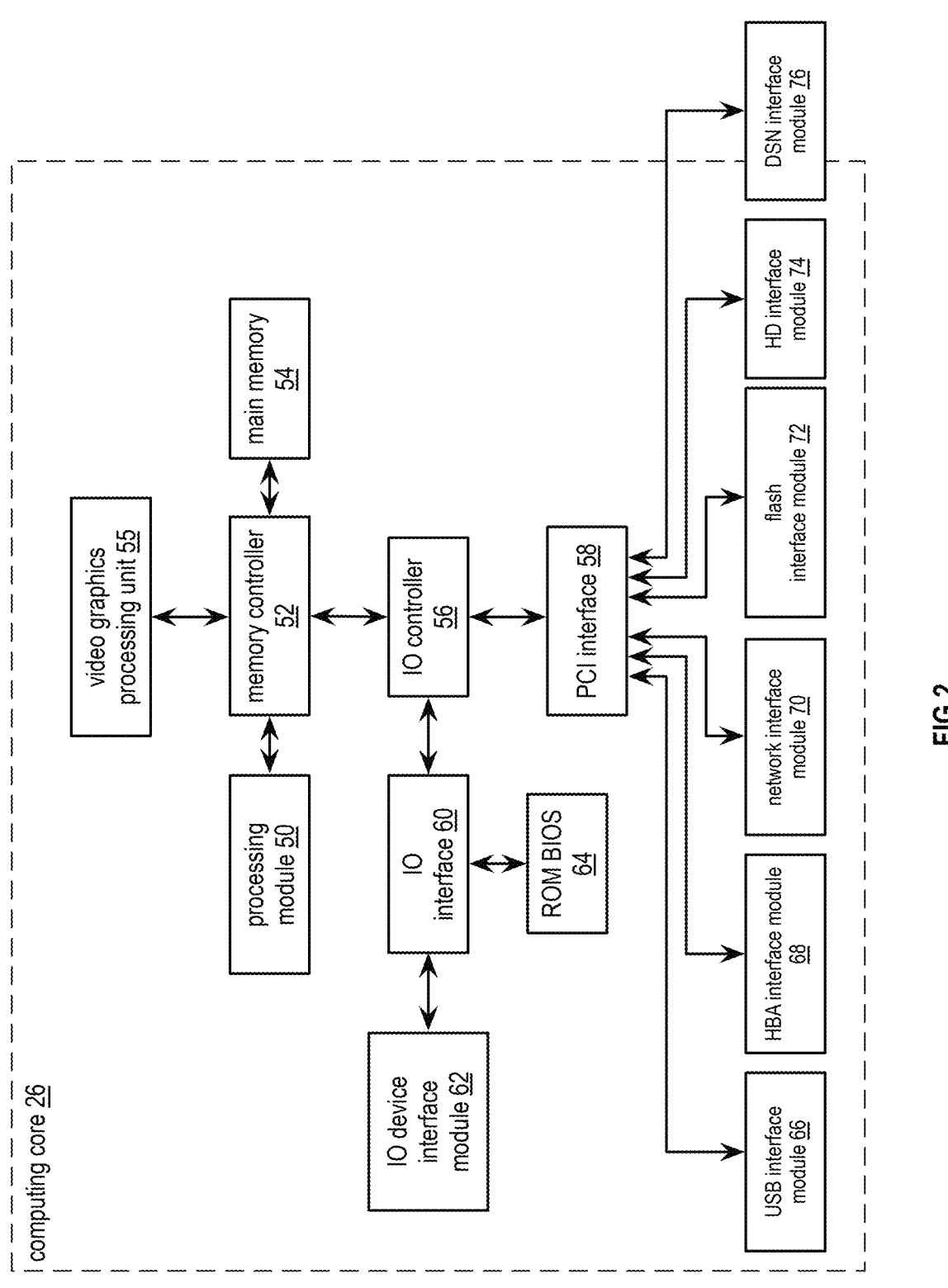
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-26.

Figure 3:
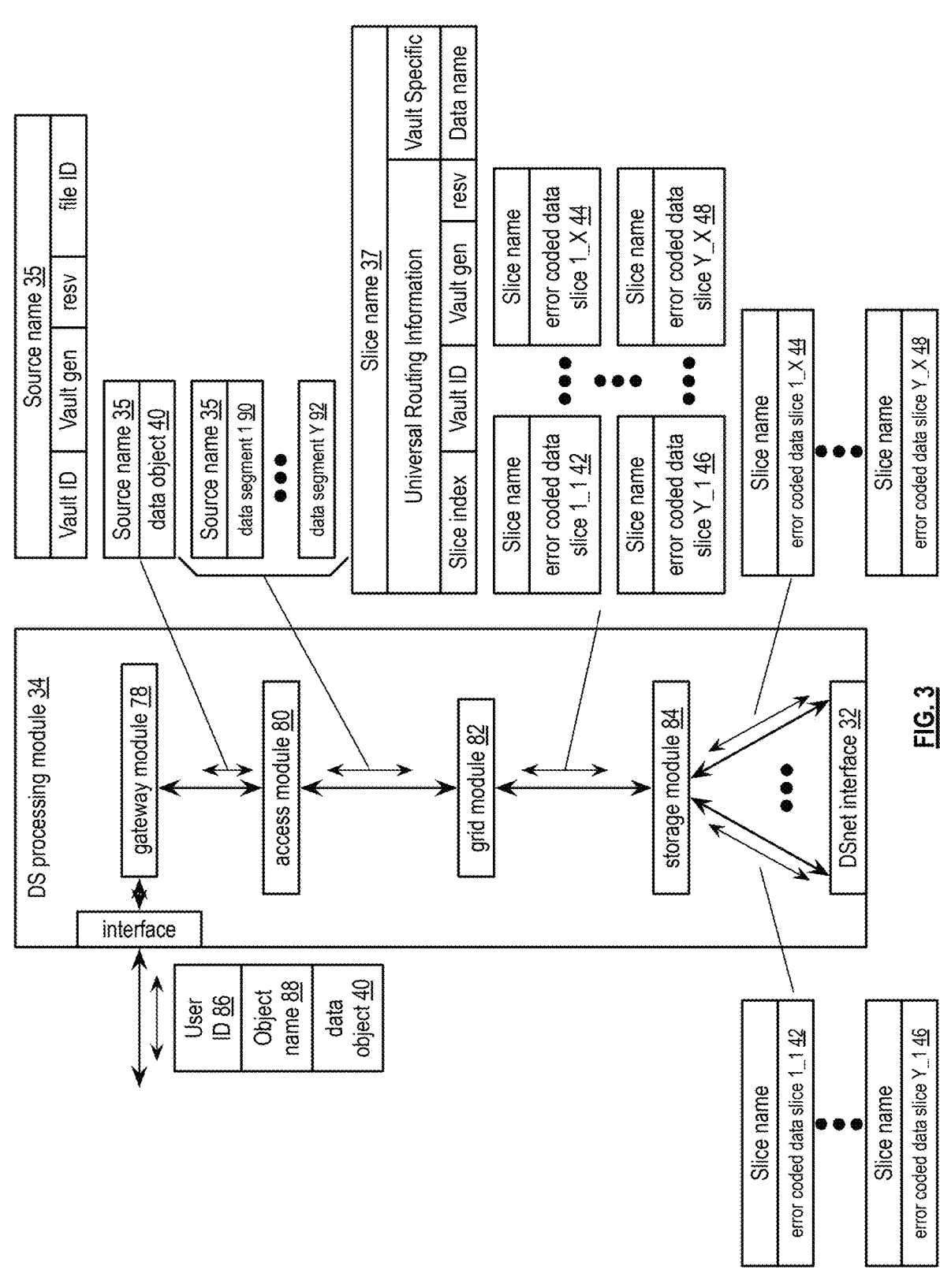
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figures 4, 5:
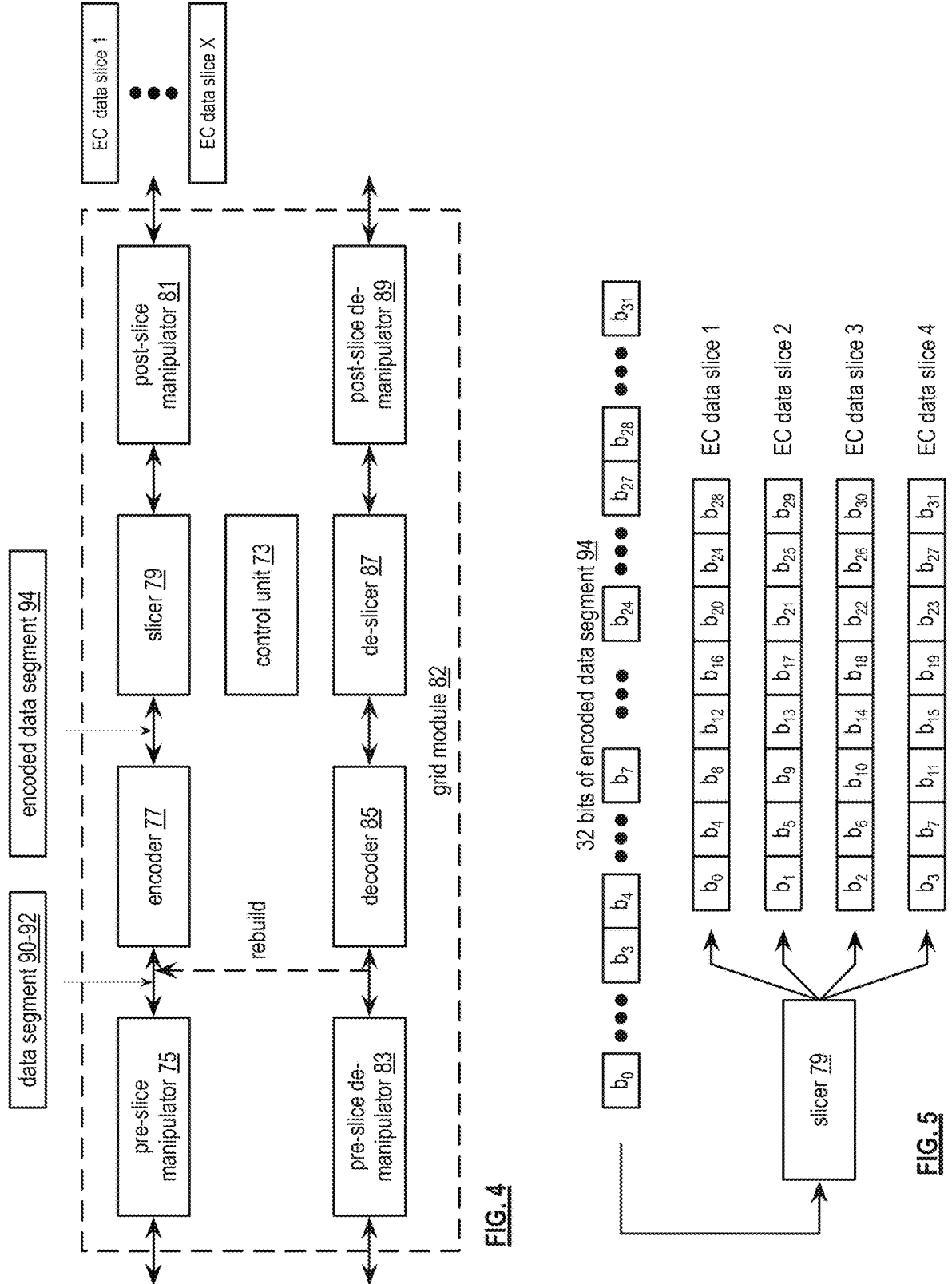
FIG. 4 is a schematic block diagram of an embodiment of a grid module in accordance with the invention.
FIG. 5 is a diagram of an example embodiment of error coded data slice creation in accordance with the invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
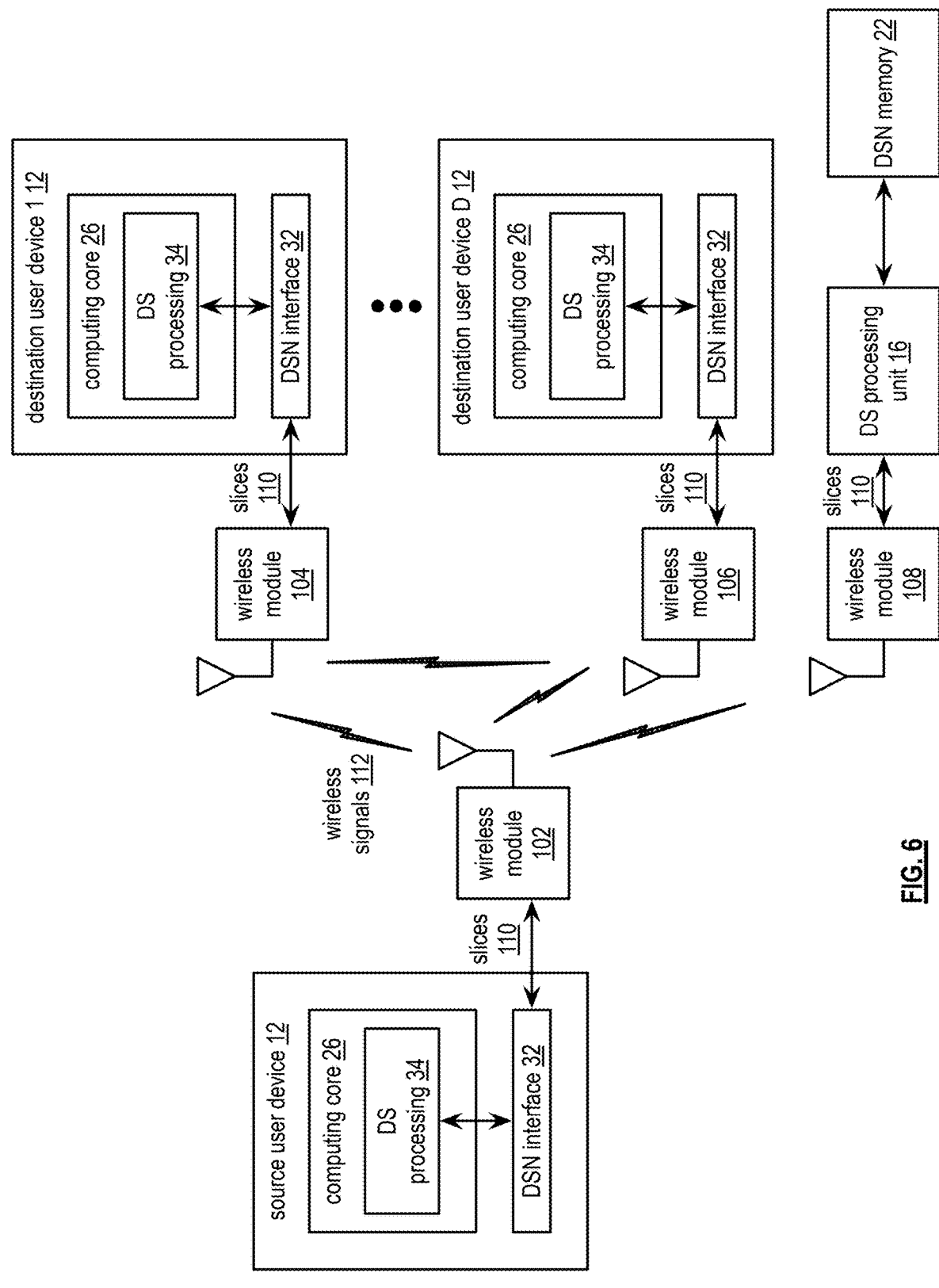
FIG. 6 is another schematic block diagram of another embodiment of a computing system in accordance with the invention.

FIG. 6 is a schematic block diagram of another embodiment of a computing system that includes a source user device 12, a plurality of destination user devices 1-D 12, a plurality of wireless modules 102-108, a dispersed storage (DS) processing unit 16, and a dispersed storage network (DSN) memory 22. Each of user devices 12 includes a computing core 26 and a DSN interface 32, wherein the computing core 26 includes a DS processing 34. Each of the wireless modules 102-108 may be portable devices (e.g., cell phone, tablet computer, radio, etc.) or fixed devices (e.g., access point, cellular base station, a radio site, etc.) and each includes a radio frequency transceiver and baseband processing circuitry. The wireless modules 102-108 operate in accordance with one or more wireless industry standards including, but not limited to, universal mobile telecommunications system (UMTS), global system for mobile communications (GSM), long term evolution (LTE), wideband code division multiplexing (WCDMA), IEEE 802.11, IEEE 802.16.

Note that a wireless broadcast service is provided by the wireless module 102 by way of a common wireless resource including but not limited to a common frequency division multiplexing frequency (e.g., channel), a common time division multiplexing slot, a common code division multiplexing code, and/or a common frequency hopping sequence. In an example, all slice pillars produced from a common data object are transmitted as wireless signals of a common wireless resource. In another example, each slice pillar produced from the same data object is transmitted as wireless signals via two or more wireless resources (e.g., two or more frequencies).

In an example of operation, the source user device 12 is contained in a mobile vehicle (e.g., an aircraft, a ship, a truck, etc.) and is operable to securely transmit audio/video (A/V) data (e.g., a live video stream, an image file, a video file, an audio file, a text file, a text communication, etc.) to one or more of the destination user devices and/or to the DSN memory 22. In this example, the source user device 12 receives the audio/video data from an A/V source (e.g., one or more digital cameras, one or more microphones, etc.) and the DS processing module 34 encrypts the A/V data. The DS processing module 34 then partitions the encrypted data into data segments and encodes each of the data segments using a dispersed storage error encoding function to produce a plurality of sets of encoded data slices. Note that a set of encoded data slices corresponds to a data segment of the encrypted data.

As the DS processing module 34 is producing sets of encoded data slices, it stores them until a threshold number of encoded data slices are stored. Once a threshold number of encoded data slices are stored, the DS processing module

34 outputs encoded data slices to the DSN interface in accordance with a pseudo-random sequencing order. The pseudo-random sequencing order ensures that the encoded data slices of a set of encoded data slices are not outputted sequentially, but are outputted in a random order with encoded data slices of other sets to add further security to the transmission of the A/V data. For example, the pseudo-random sequencing order randomly orders the data segments prior to dispersal storage error encoding and then randomly orders the encoded data slices. As another example, the pseudo-random sequencing order randomly orders the encoded data slices.

The wireless module 102 converts the randomly ordered encoded data slices into outbound RF signals in accordance with one or more standardized wireless communication protocols or a proprietary wireless communication protocol. For example, the baseband circuitry of the wireless module 102 converts an encoded data slice (a portion or an encoded data slice or multiple encoded data slices) into an outbound symbol stream. The RF transceiver of the wireless module converts the outbound symbol stream into an outbound RF signal.

At least one of the other wireless modules 104-108 receives the outbound RF signals of wireless module 102 and determines whether it is a destination. For example, the RF signals include destination address information, which the receiving wireless modules interpret to determine whether they are destinations. As another example, the RF signals include source address information, which the receiving wireless modules interpret to determine whether they are destinations for the source.

When a wireless module 104-108 is a destination, it converts the RF signals into the encoded data slices 110 and provides them to the corresponding DS unit (e.g., user device 12 or DS processing unit 16). The corresponding DS unit uses a pseudo-random de-sequencing order to re-order the received encoded data slices into sets of encoded data slices. The corresponding DS unit then decodes the set of encoded data slices using a dispersal storage error decoding function to produce the data segments, which are decrypted to re-produce the A/V data. To ensure security of the A/V data transmission, the pseudo-random sequencing/de-sequencing order and the dispersal storage error encoding/decoding function is securely communicated between the source user device 12 and the corresponding destination unit(s) (e.g., destination user devices and/or the DS processing unit).

Figure 7:
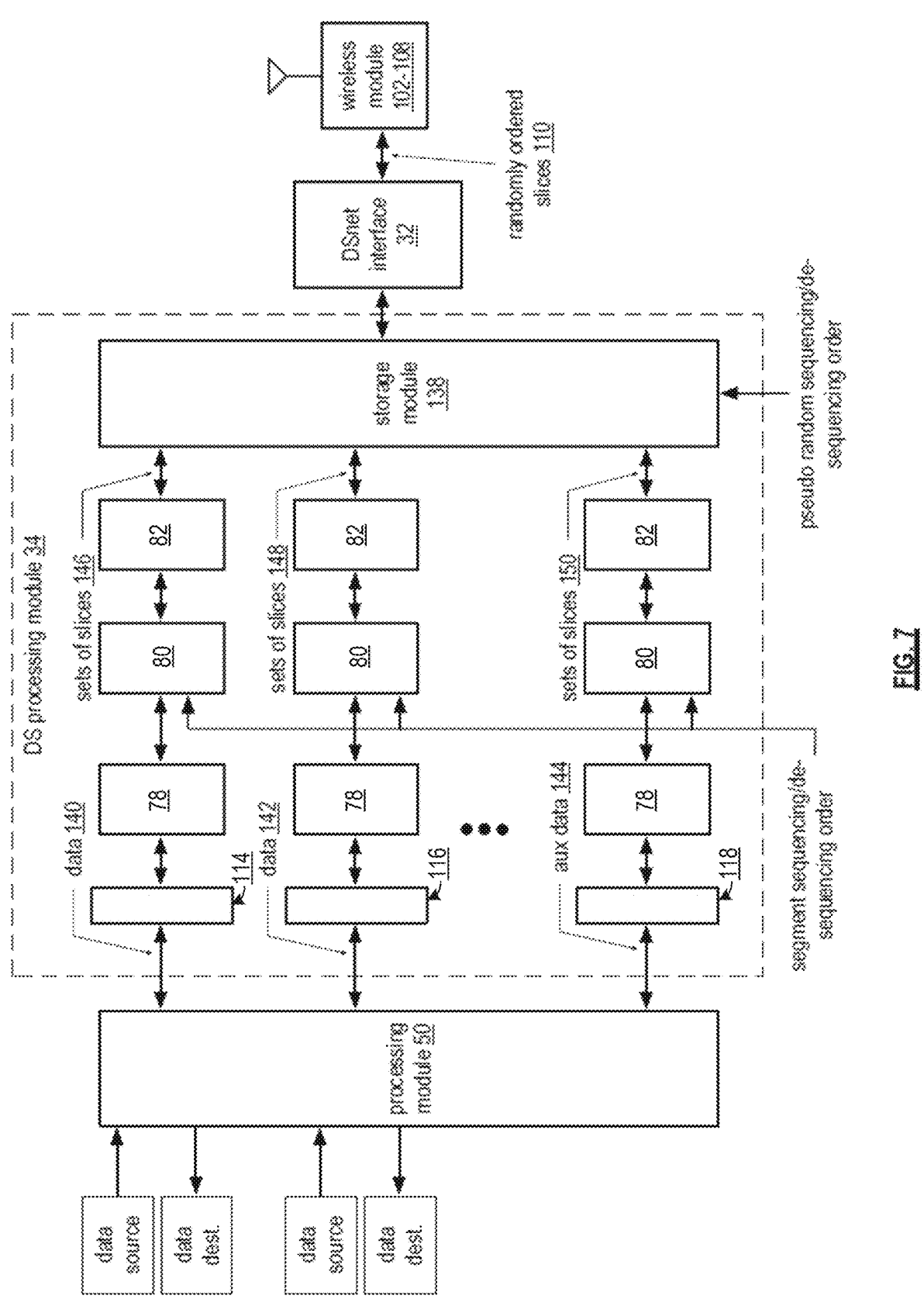
FIG. 7 is another schematic block diagram of an embodiment of a dispersed storage (DS) processing module in accordance with the invention.

FIG. 7 is a schematic block diagram of another embodiment of a dispersed storage (DS) processing module 34 coupled to the DSnet interface 32 and the processing module 50. The processing module 50 is coupled to one or more data sources (e.g., camera, microphone, text messaging input, etc.) and the DSnet interface 32 is coupled to a wireless module 102. The DS processing module includes a storage module 138, a plurality of interfaces 114-118, a plurality of gateway modules 78, a plurality of access modules 80, and a plurality of grid modules 82. The interface modules 114-118, the gateway modules 78, the access modules 89, and the grid modules 82 are arranged in sets for processing different data (e.g., data 140-144), which includes A/V data from one or more data sources (e.g., cameras, computer, microphones, etc.) and/or auxiliary data 144 (e.g., null data, authentication information, a next pseudo random output sequencing order, a pseudo random output sequencing order identifier, a next outputting threshold, a random number generator output, an encryption key, a starting point for the pseudo random output sequencing order, a device identifier, a data identifier, a data type, a data size indictor, a priority indicator, a security indicator, and/or a performance indicator).

In a first example of operation, one or more of the data sources provides data to the processing module 50 and/or directly to the DS processing module 34. For example, a first digital camera provides a stream of video directly to interface 114 of the DS processing module 50 and a second camera provides A/V data to the processing module 50 for A/V processing (e.g., video encoding, video decoding, compression, aspect ratio conversion, etc.). The processing module 50 provides the processed A/V data to interface 116 of the DS processing module 34. The processing module, or an auxiliary data source, may also generate auxiliary data 144, which is provided to interface 118 of the DS processing module 34.

Each set of gateway, access, and grid modules 78, 80, and 82 perform their corresponding functions on the data 140, 142, or auxiliary data 144, to produce one or more sets of slices 146-150. For instance and as discussed with reference to one or more of FIGS. 1-5, the gateway module 78 accommodates a file system of a data source (e.g., a computing core) by translating a computer file system to a virtual dispersed storage network (DSN) addressing (e.g., a source name). The access module 80 converts the data 140-144 into sequential data segments (e.g., segment 1, segment 2, segment 3, etc.). Alternatively, the access module 80 converts the data 140-144 into non-sequential data segments (e.g., segment 4, segment 1, segment 3, etc.) in accordance with a segment sequence sequencing/de-sequencing order. The grid module 82 encrypts and dispersal storage error encodes a data segment into a set of encoded data slices in a sequential order (e.g., pillar 0 slice 1, pillar 0 slice 2 etc., pillar 1 slice 1, pillar 1 slice 2 etc.). Alternatively, the grid module 82 encrypts and dispersal storage error encodes data segments into sets of encoded data slices and outputs the encoded data slices in accordance with the pseudo random sequencing/de-sequencing order (e.g., pillar 4 slice 8, pillar 2 slice 3 etc., pillar 5 slice 4, pillar 0 slice 2 etc.).

The storage module 138 receives the sets of encoded data slices 146-150 and outputs encoded data slices in accordance with the pseudo random sequencing/de-sequencing order. The random outputting of encoded data slices may be done in combination with the segment sequencing performed by the access module 80, in combination with encoded data slice output randomize sequencing performed by the grid module 82, done without the sequencing performed by the access module or grid module, and/or a combination thereof.

As an example of the pseudo random sequencing/de-sequencing order, the storage module selects ten slices from set 1 (e.g., a set from the sets 146) followed by five slices from set 2 (e.g., a set from sets 148) followed by one slice from set 3 (e.g., a set from sets 150) etc. The storage module 138 may determine the random sequence and the starting point for the random sequence via a selection sequence generator and a seed. The seed and/or the identity of the random sequence may be included in the auxiliary data, may be embedded in the data 140, 142, and/or may be communicated using another secure mechanism.

In a second example of operation, the storage module 138 receives randomly ordered encoded data slices 110 and outputs sets of encoded data slices in accordance with the pseudo random sequencing/de-sequencing order. The grid module 82 decodes the set of encoded data slices 146-150 in accordance with a dispersal storage error decoding function to produce encrypted data segments, which it decrypts to produce data segments. Alternatively, the grid module 82 may re-order the sets of slices in accordance with the pseudo random sequencing/de-sequencing order prior to dispersal storage error decoding.

The access module 80 converts the data segments into the data 140-144. Alternatively, the access module 80 reorders the data segments in accordance with a segment sequence sequencing/de-sequencing order and then produces the data. The gateway module 78 translates the virtual dispersed storage network (DSN) addressing (e.g., a source name) into a computer file system name. The processing module 50 receives the data 140-144, processes it, and/or provides it to a data destination (e.g., a video monitor, a speaker, DSN memory, etc.).

Figure 8A:
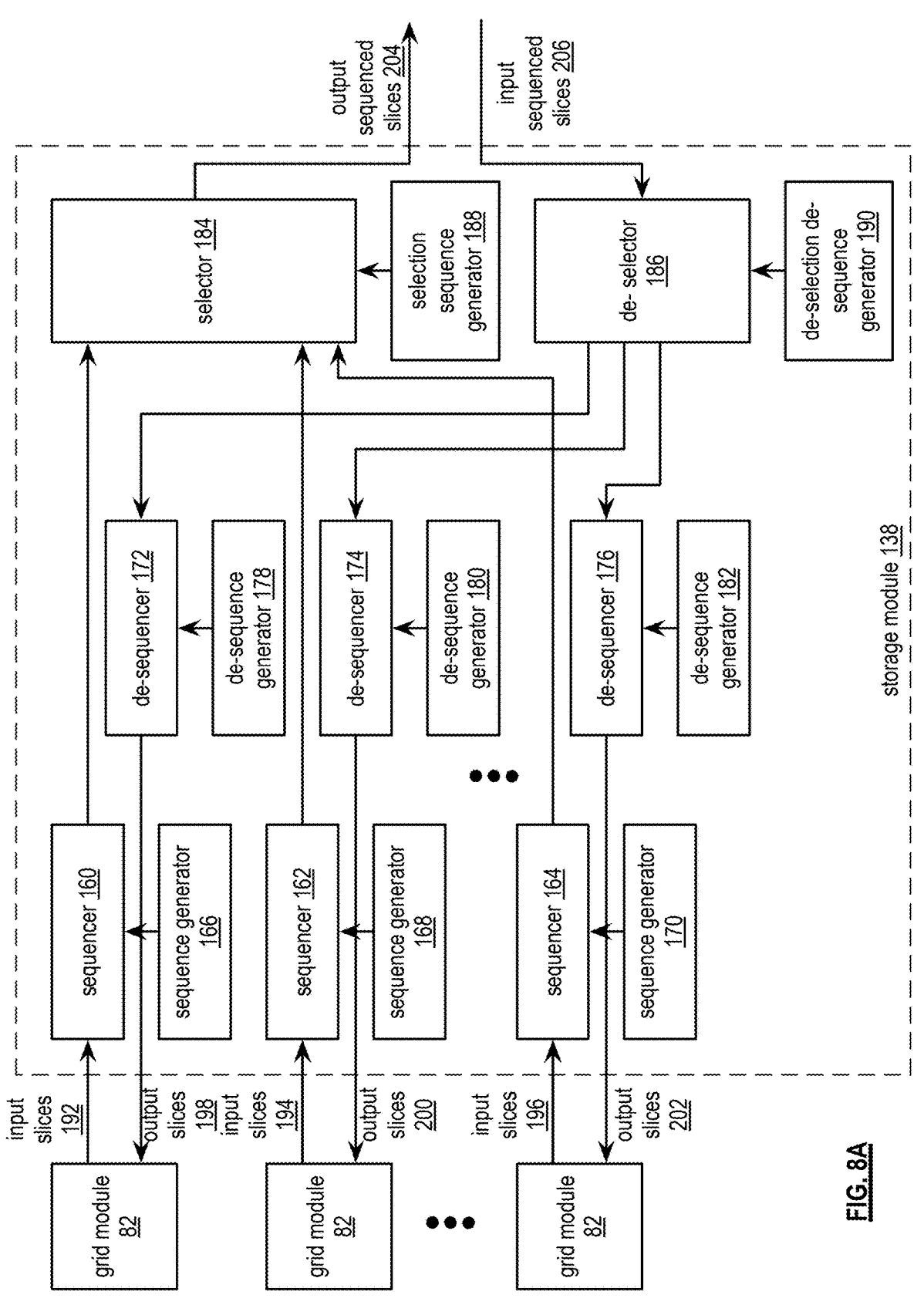
FIG. 8A is a schematic block diagram of an embodiment of a storage module in accordance with the invention.

FIG. 8A is a schematic block diagram of an embodiment of a storage module 138 that includes a plurality of sequencers 160-164, a plurality of sequence generators 166-170, a plurality of de-sequencers 172-176, a plurality of de-sequence generators 178-182, a selector 184, a selection sequence generator 188, a de-selector 186, and a de-selection de-sequence generator 190.

In an example of operation, the storage module 138 receives sets of encoded data slices 192-196 from the plurality of grid modules 82. Each sequencer 160-162 converts its sets of encoded data slices into randomly ordered sets of encoded data slices accordance with a pseudo random segment and/or slice sequence generated by the corresponding sequence generators 166-170. For instance, the sequence generators generate a random sequence based on a seed that reorders the corresponding sets of encoded data slices, reorders slices within a set of slices, and/or reorders slices and sets of slices. Alternatively, the sequence generator generates a null sequence such that the sequencer outputs the encoded data slices in the order they were received (i.e., first in, first out).

The selector 184 selects slices from sequencers 160-164 in accordance with a selection sequence. The selection sequence generator 188 generates the selection sequence in accordance with the pseudo random sequencing/de-sequencing order. As a specific example, the select sequence generator 188 generates a selection sequence that causes the selector 184 to select ten slices from sequencer 160, then five slices from sequencer 162, and then three slices from sequencer 164, which are subsequently outputted as output sequenced slices 204.

In another example of operation, the de-selector 186 receives input sequenced slices 206 and provides them to the de-sequencers 172-176 in accordance with a de-sequence order. The de-selection de-sequence generator 190 generates the de-sequence order in accordance with the pseudo random sequencing/de-sequencing order. As a specific example, the de-selection de-sequence generator 190 generates the de-sequence order such that the de-selector 186 sends ten slices of the input sequenced slices 206 to de-sequencer 172, the five slices to de-sequencer 174, and then three slices to de-sequencer 176.

Each of the de-sequencers 172-176 produces sets of encoded data slices as ordered output slices 198-202 in accordance with a slice and/or segment de-sequence order that is generated by a corresponding de-sequence generator 178-182. For instance, the de-sequence generators generate a random sequence based on a seed that reorders the received slices into sets of encoded data slices. Alternatively, the de-sequence generator generates a null sequence such that the de-sequencer outputs the encoded data slices in the order they were received (i.e., first in, first out).

The segment and/or slice sequence/de-sequence order may be part of the pseudo random sequencing/de-sequencing order. In addition, each pair of sequence generators and de-sequence generators may generate the same sequence/de-sequence order or different sequence/de-sequence orders. Further, the pseudo random sequencing/de-sequencing order includes one or more of one or more slice sequence/de-sequence orders, a selection sequence/de-sequence, a sequence/de-sequence seed determination, one or more sequence/de-sequence seeds. Still further, the pseudo random sequencing/de-sequencing order may be determined based on one or more of a performance indicator, a security indicator, a security indicator, sequence information, a key, a user device identifier (ID), a lookup, a list, a command, a predetermination, a message, an algorithm, a data object, a data object ID, a data type, a data size, and a hash of the data. Even further, the pseudo random sequencing/de-sequencing order may be generated by any one of a variety of pseudo random number generation techniques that may be implemented in software, programmable logic, and/or a state machine.

FIG. 8B is a diagram illustrating an example of pseudo random sequencing/de-sequencing of encoded data slices within the storage module 138 for two different data streams (e.g., data 1 and data 2). In this example, an encrypted data segment is dispersal storage error encoded into five encoded data slices. For instance, data segment 1 of data 1 is encoded into five encoded data slices (e.g., data 1, segment 1, slice 1, through data 1, segment 1, slice 5).

For pseudo random sequencing, the storage module 138 receives the encoded data slices of data 1 and data 2, stores them, and when a threshold number (e.g., X times the pillar width, which, for this example is 6 times 5=30) applies the pseudo random sequencing order to randomize the outputting of the encoded data slices. In this example, the pseudo random sequencing/de-sequencing order randomized encoded data slices are sequenced and selected to produce slices in order of data 2, segment 2, slice 3 followed by data 1, segment 1, slice 3, followed by data 1, segment 2, slice 1, followed by data 2, segment 3, slice 2, followed by data 2, segment 1, slice 4, etc.

For pseudo random de-sequencing, the storage module 138 receives the randomized encoded data slices 209, stores them until a threshold number are stored, and then applies the pseudo random de-sequencing order to reproduce the encoded data slices 205 of data 1 and the encoded data slices 207 of data 2. The storage module 138 may output the de-sequenced encoded data slices are they are de-sequenced or store a data segment's worth of slices and then send the set of encoded data slices.

FIG. 8C is a diagram illustrating an example of pseudo random sequencing/de-sequencing of encoded data slices within the storage module 138 for two different data streams (e.g., data 1 and data 2, which may be auxiliary data). In this example, the access module 80 of the DS processing module 34 randomized the data segments prior to the grid module 82 dispersal storage error encoding the data segments. The randomizing of the data segments may be different for each data path or it may be the same.

In the present example, the data segments of the first data path are randomized using a first segment sequence to produce, for three data segments, a randomized data segment order of 3, 1, 2. The data segments of the second data path are randomized using a second segment sequence to produce, for three data segments, a randomized data segment order of 2, 1, 3. The storage module 138 randomizes and de-randomizes the encoded data slices of the randomized data segments using the pseudo random sequencing/de-sequencing order as previously discussed.

Figure 8D:
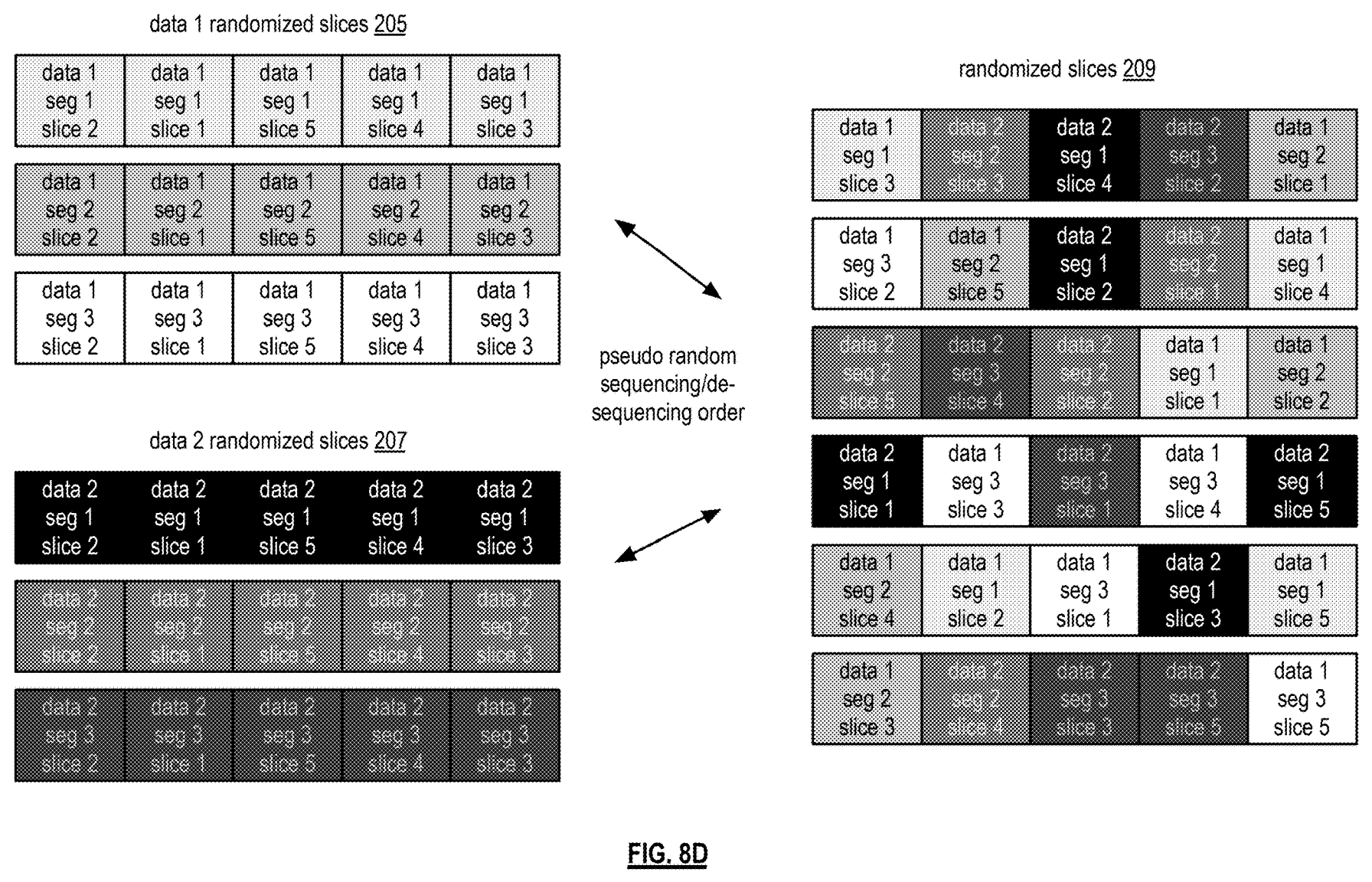

FIG. 8D is a diagram illustrating an example of pseudo random sequencing/de-sequencing of encoded data slices within the storage module 138 for two different data streams (e.g., data 1 and data 2). In this example, the grid module 82 of the DS processing module 80 randomized the encoded data slices for each data segment it dispersal storage error encodes. The randomizing of the encoded data slices may be different for each data path or it may be the same. The randomizing of the encoded data slices may also be the same or different for each data segment.

In the present example, each of the data segments of the first and second data paths are randomized using the same sequence to produce, for five encoded data slices per data segment, a randomized encoded data segment order of 2, 1, 5, 4, 3. The storage module 138 randomizes and de-randomizes the randomized encoded data slices using the pseudo random sequencing/de-sequencing order as previously discussed.

Figure 8E:
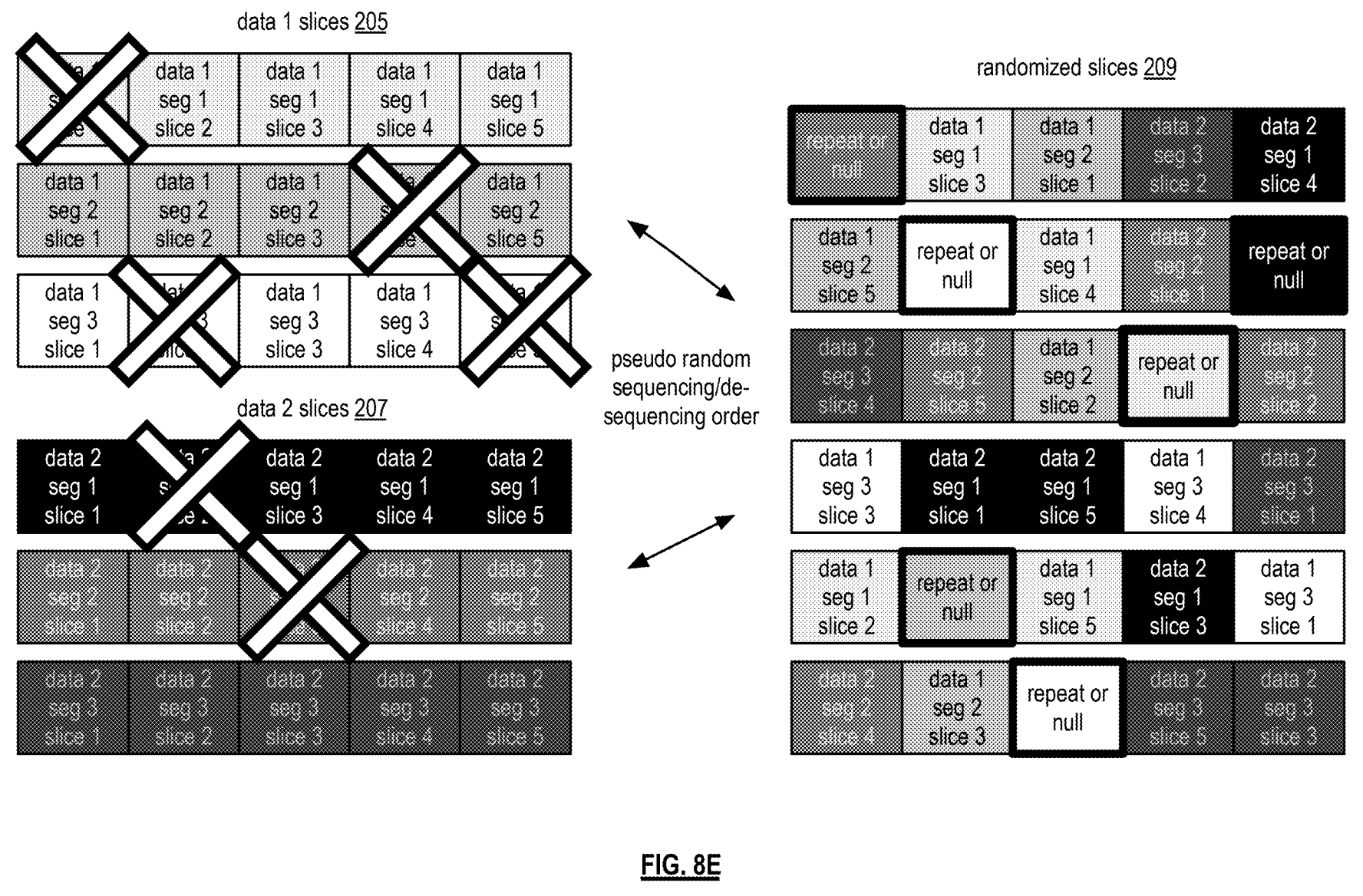

FIG. 8E is a diagram illustrating an example of pseudo random sequencing/de-sequencing of encoded data slices within the storage module 138 for two different data streams (e.g., data 1 and data 2). In this example, an encrypted data segment is dispersal storage error encoded into five encoded data slices, but, for at least some of the data segments, less than all of the encoded data slices will be outputted. For instance, the first encoded data slice of data segment 1 of data 1 will not be outputted; the fourth encoded data slice of data segment 2 of data 1 will not be outputted; the second and fifth encoded data slices of data segment 3 of data 1 will not be outputted; the second encoded data slice of data segment 1 of data 2 will not be outputted; and the third encoded data slice of data segment 2 of data 2 will not be outputted.

For pseudo random sequencing, the storage module 138 receives the encoded data slices of data 1 and data 2, stores them, and a threshold number applies the pseudo random sequencing order to randomize the outputting of the encoded data slices. When the storage module 138 reaches one of the encoded data slices that is not to be outputted, it outputs a null data slice or repeats one of the other encoded data slices.

For pseudo random de-sequencing, the storage module 138 receives the randomized encoded data slices 209, stores them until a threshold number are stored, and then applies the pseudo random de-sequencing order to reproduce the encoded data slices 205 of data 1 and the encoded data slices 207 of data 2, less the omitted encoded data slices. When the storage module 138 outputs a set of encoded data slices that includes one or more omitted encoded data slices, it may output the set without the omitted encoded data slice(s) or it may output a null data slice in the place of the omitted encoded data slice.

The examples of FIGS. 8B-8E are equally applicable for data from a single source. In this instance, the pseudo random sequencing/de-sequencing order is applied to sets of encoded data slices of data segments of data from a single source.

Figure 9:
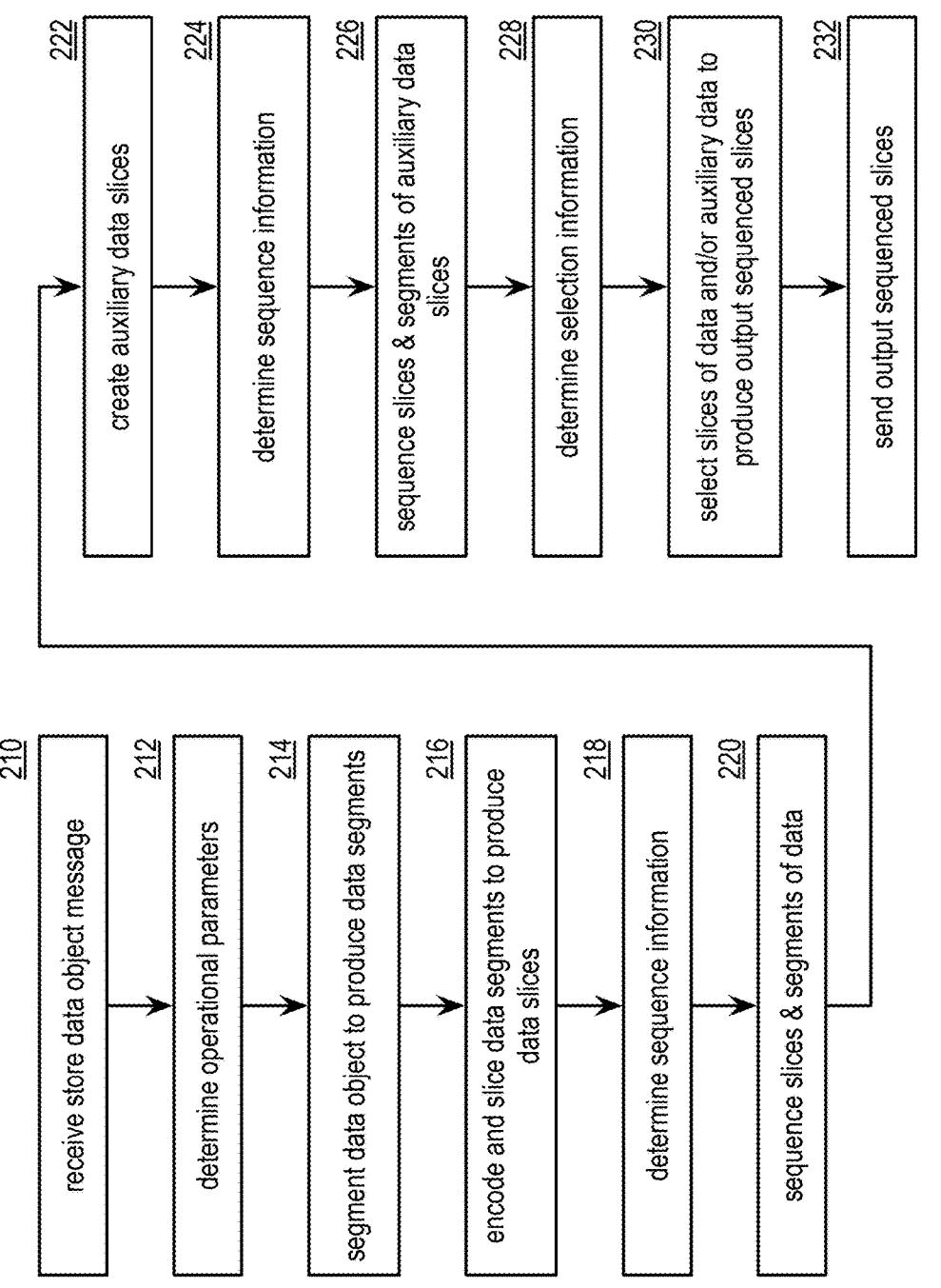
FIG. 9 is a flowchart illustrating an example of encoding data to produce encoded data slices in accordance with the invention.

FIG. 9 is a flowchart illustrating an example of encoding data to produce encoded data slices. The method begins with step 210 where a processing module receives a store data object message from one or more of a computing core, a user device, a dispersed storage (DS) processing unit, a storage integrity processing unit, a DS managing unit, a DS unit, and a process or function of a user device. The store data object message includes a requester identifier (ID) (e.g., a source user device ID), a target ID (e.g., a destination user device ID), a data object name, data, a data stream (e.g., a video stream), sequence information, a key (e.g., an encryption key), a priority indicator, a security indicator, and/or a performance indicator.

The method continues at step 212 where the processing module determines one or more sets of error coding dispersal storage function parameters regarding the data of the data object message and for auxiliary data. For example, one set of error coding dispersal storage function parameters may be determined for the data and another set may be determined for the auxiliary data. As another example, the same error coding dispersal storage function parameters are determined for both the data and the auxiliary data.

The method continues at step 214 where the processing module segments the data in accordance with the error coding dispersal storage function parameters. The processing module segments the data into data segments, which may be outputted in a variety of ways. For example, the processing module outputs the data segments in the order in which they were created (i.e., sequentially). As another example, the processing module outputs the data segments in accordance with a segment sequencing order (i.e., pseudo randomly non-sequential).

The method continues at step 216 where the processing module dispersed storage error encodes the data segments to produce sets of encoded data slices (e.g., one set per data segment). The processing module may output the sets of encoded data slices in a variety of ways. For example, the processing module outputs the encoded data slices of a set in the order in which they were created (i.e., sequentially). As another example, the processing module outputs the encoded data slices of a set in accordance with a segment sequencing order (i.e., pseudo randomly non-sequential). As yet another example, the processing module outputs a threshold number of a set of encoded data slices (e.g., a read threshold, a write threshold, a decode threshold, etc.). As a further example, the processing module buffers a set of encoded data slices in two buffers: the first including a threshold number of encoded data slices and the second including the remaining encoded data slices. In this example, the processing module outputs the encoded data slices of the first buffer and outputs zero to all of the encoded data slices of the second buffer.

At step 216, the processing module may also generate a slice name for each encoded data slice of a set. The processing module determines slice information for a set of encoded data slices and encrypts the slice information to produce the slice name, which may be buffered.

The method continues at step 218 where the processing module determines a pseudo-random sequencing order and/or sequence information. For example, the processing module determines a pseudo-random sequencing order associated with algorithm 3AC (e.g. a pseudo random number generation algorithm), a sequence seed of 1F46D8EA39B based on a calculating a hash over requester ID 5F02D77B, and a key of 34D8AB90, which was embedded in the sequencing information.

The method continues at step 220 where the processing module sequences the outputting of encoded data slices in accordance with the pseudo-random sequencing order. For example, the processing module buffers encoded data slices of the sets until a threshold number have been buffered. When a threshold number of slices have been buffered, the processing module outputs the encoded data slices based on the pseudo-random sequencing order; example of which were discussed with reference to FIGS. 8B-8E.

The method continues at step 222 where the processing module dispersal storage error encodes auxiliary data using the parameters determined at step 212 to produce one or more sets of encoded auxiliary data slices. The auxiliary data, which may be encrypted using one or more the encrypting functions discussed herein prior to dispersal storage error encoding, includes null data, authentication information, a next pseudo random output sequencing order, a pseudo random output sequencing order identifier, a next outputting threshold, a random number generator output, an encryption key, a starting point for the pseudo random output sequencing order, a device identifier, a data identifier, a data type, a data size indictor, a priority indicator, a security indicator, and/or a performance indicator. For example, a video stream is the data of steps 214 & 216 and a next pseudo random output sequencing order is the auxiliary data.

The method continues at step 224 where the processing module determines auxiliary data sequence information (i.e., a pseudo-random sequencing order). The method continues at step 226 where the processing module sequences outputting of the encoded auxiliary data slices, which may be similar to sequencing the outputting of the encoded data slices.

The method continues at step 228 where the processing module determines selection information, which includes a pseudo random output sequencing order, a selection algorithm ID, a de-selection algorithm ID, a seed generation algorithm ID, a key, an ID, a hash algorithm, and/or a sequence seed. The method continues at step 230 where the processing module selects encoded data slices and encoded auxiliary data slices to produce output sequenced slices in accordance with the selection information. The method continues at step 232 where processing module transmits the output sequenced slices to one or more destinations via a wired and/or wireless network.

In addition, at step 232, the processing module may compare an ingress number of encoded data slices being buffered to an egress number of encoded data slices being outputted within a given time interval when a number of buffered encoded data slices compares favorably to the threshold. Next, the processing module adjusts the dispersed storage error encoding of the data segment such that the comparing of the ingress number to the egress number is favorable with respect to an underflow threshold when the comparing of the ingress number to the egress number is unfavorable with respect to the underflow threshold. Alternatively, the processing module may adjust the dispersed storage error encoding of the data segment such that the comparing of the ingress number to the egress number is favorable with respect to an overflow threshold when the comparing of the ingress number to the egress number is unfavorable with respect to the overflow threshold.

Figure 10:
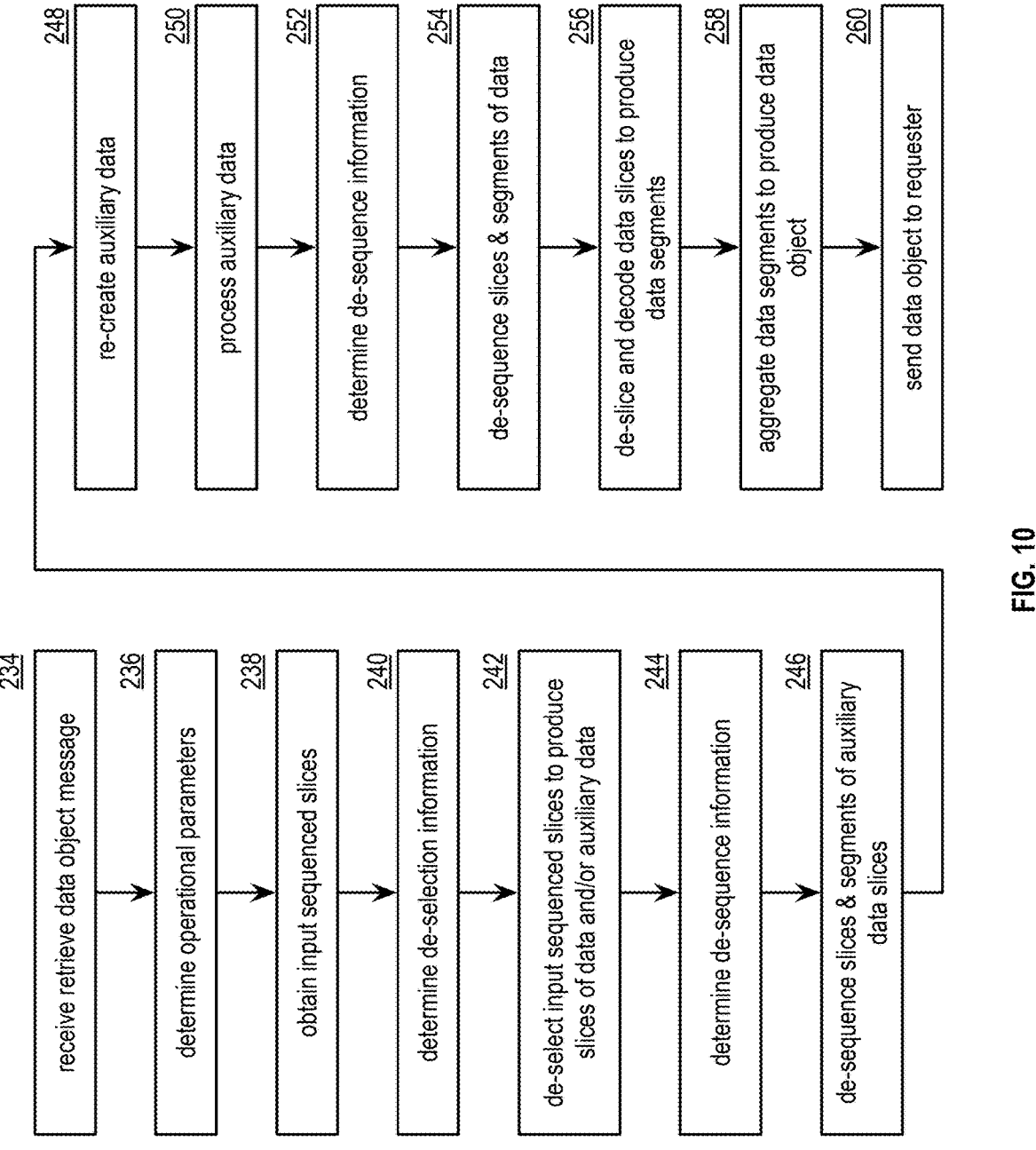
FIG. 10 is a flowchart illustrating an example of decoding encoded data slices to produce data in accordance with the invention.

FIG. 10 is a flowchart illustrating an example of decoding encoded data slices to produce data. The method begins with step 234 where a processing module receives a retrieve data object message from one or more of a computing core, a user device, a dispersed storage (DS) processing unit, a storage integrity processing unit, a DS managing unit, a DS unit, and a process or function of a user device). The retrieve data object message includes one or more of a requester identifier (ID) (e.g., a source user device ID), a target ID (e.g., a destination user device ID), a data object name, a data object, sequence information, a key (e.g., an encryption key), a priority indicator, a security indicator, and a performance indicator.

The method continues at step 236 where the processing module determines error coding dispersal stored function parameters as previously discussed. The method continues at step 238 where the processing module obtains at least an ordering threshold number of encoded data slices to produce obtained encoded data slices from a user device, from DSN memory, etc.

The method continues at step 240 where the processing module determines de-selection information, which is the compliment to the selection information and is determined in a similar fashion. The method continues at step 242 where the processing module de-selects input sequenced slices (e.g., the received randomized encoded data slices) in accordance with the de-selection information. For example, this separates randomized encoded data slices from the randomized encoded auxiliary data slices.

The method continues at step 244 where the processing module determines auxiliary data de-sequence information, which is complimentary to the auxiliary data sequence information. The method continues at step 246 where the processing module de-sequences the sequenced (i.e., randomized) encoded auxiliary data slices to produce de-sequenced encoded auxiliary data slices. The method continues at step 248 where the processing module recreates the auxiliary data from the de-sequenced encoded auxiliary data slices in accordance with the auxiliary error coding dispersal storage function parameters. If the auxiliary data was encrypted, this step further includes decrypting the auxiliary data.

The method continues at step 250 where the processing module processes the auxiliary data in accordance with one or more of the auxiliary error coding dispersal storage function parameters, a flag, a command, a lookup, and the de-sequence information. For example, the processing module discards at least some of the auxiliary data when the de-sequence information indicates that the auxiliary data contains random numbers. In another example, the processing module subsequently de-sequences sequenced encoded data slices of a sequence seed contained within the auxiliary data when the de-sequence information indicates that the auxiliary data contains the sequence seed. In another example, the processing module subsequently de-sequences sequenced encoded data slices of desired data utilizing de-sequence information contained within the auxiliary data when the de-sequence information indicates that the auxiliary data contains the de-sequence information.

The method continues at step 252 where the processing module determines data de-sequence information, which is complimentary to the data sequence information. The method continues at step 254 where the processing module orders (e.g., de-sequences) the randomized encoded data slices based on the pseudo-random de-sequencing order to produce a plurality of sets of encoded data slices. The method continues at step 256 where the processing module dispersed storage error decodes the plurality of sets of encoded data slices to produce a plurality of data segments in accordance with the error coding dispersal storage function parameters.

The method continues at step 258 where the processing module aggregates the plurality of data segments to produce the data (e.g., a data stream or one or more data objects). The processing module may aggregate the plurality of data segments by ordering them in accordance with a data segment order of the pseudo-random de-sequencing order. The method continues at step 260 where the processing module sends the data to a requester.

Figure 11:
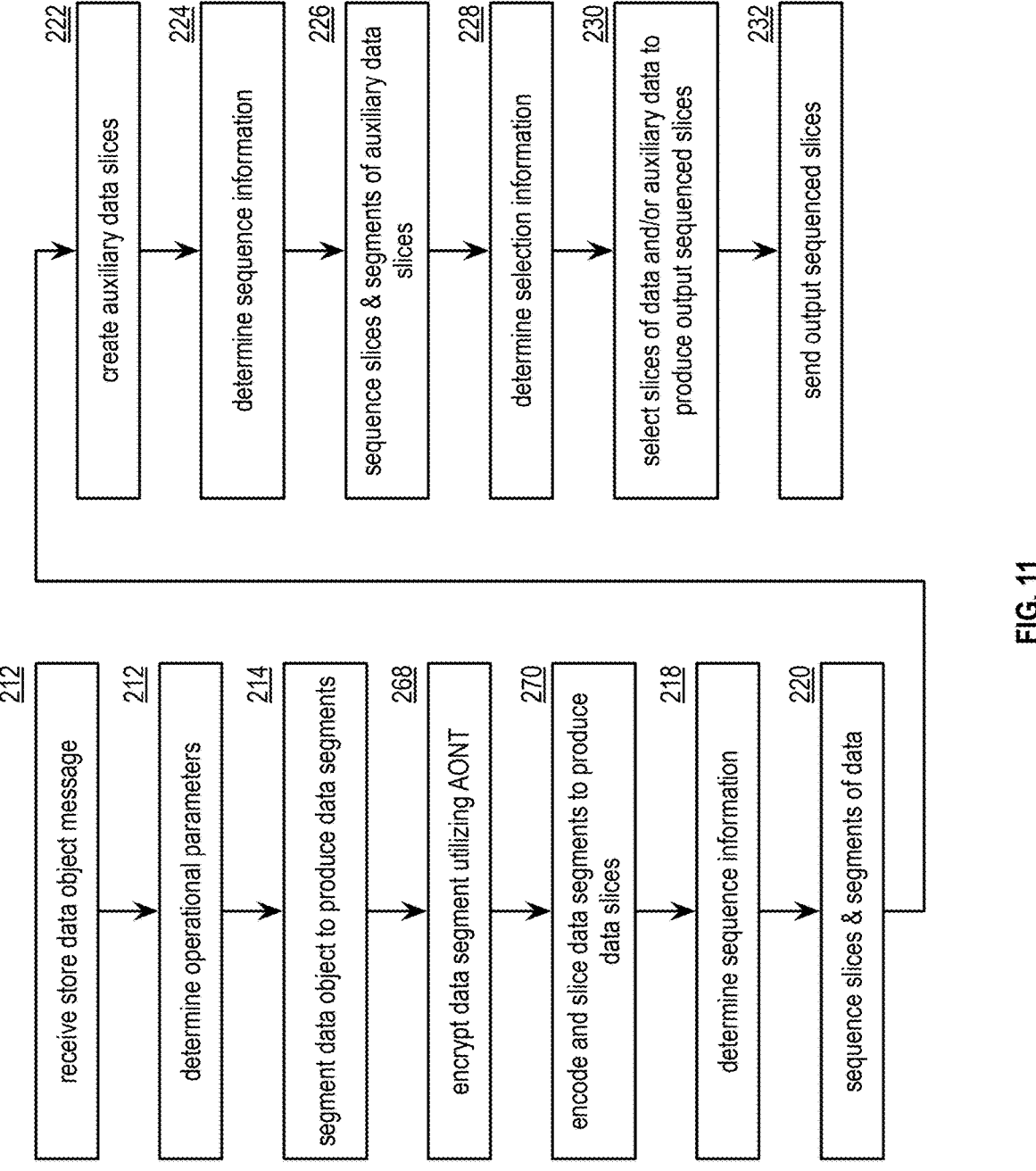
FIG. 11 is a flowchart illustrating another example of encoding data to produce encoded data slices in accordance with the invention.

FIG. 11 is another flowchart illustrating another example of encoding data to produce encoded data slices, which includes many similar steps to FIG. 9. The method begins with steps 210-214 of FIG. 9 and then continues with step 268 where, in order of receiving data segments, the processing module encrypts a data segment to produce an encrypted data segment. The processing module may encrypt the data segment using one or more encrypting functions, which include an all or nothing transformation (AONT), a stored encryption key and an encryption algorithm, a random encryption and an encryption algorithm, an encryption key associated with at least one recipient and an encryption algorithm, an obfuscating method, and/or a null encryption method.

As a specific example, the processing module encrypts the data segment utilizing an all or nothing transformation (AONT) to produce an encrypted data segment. The processing module then calculates a hash of the encrypted data segment utilizing a hash function (e.g., secure hash function SHA-256, SHA-512 etc.), which may use a secret key. The processing module truncates the encrypted data hash to match the number of bits of the secret key, or other key. The processing module calculates an exclusive OR (XOR) of the key and the (truncated) encrypted data hash to produce a masked key. The processing module appends the masked key to the encrypted data segment, which is subsequently dispersal storage error encoded.

The method continues at step 270 where the processing module dispersed storage error encodes the encrypted data segments to sets of encoded data slices. The method concludes with steps 218-232 of FIG. 9.

Figure 12:
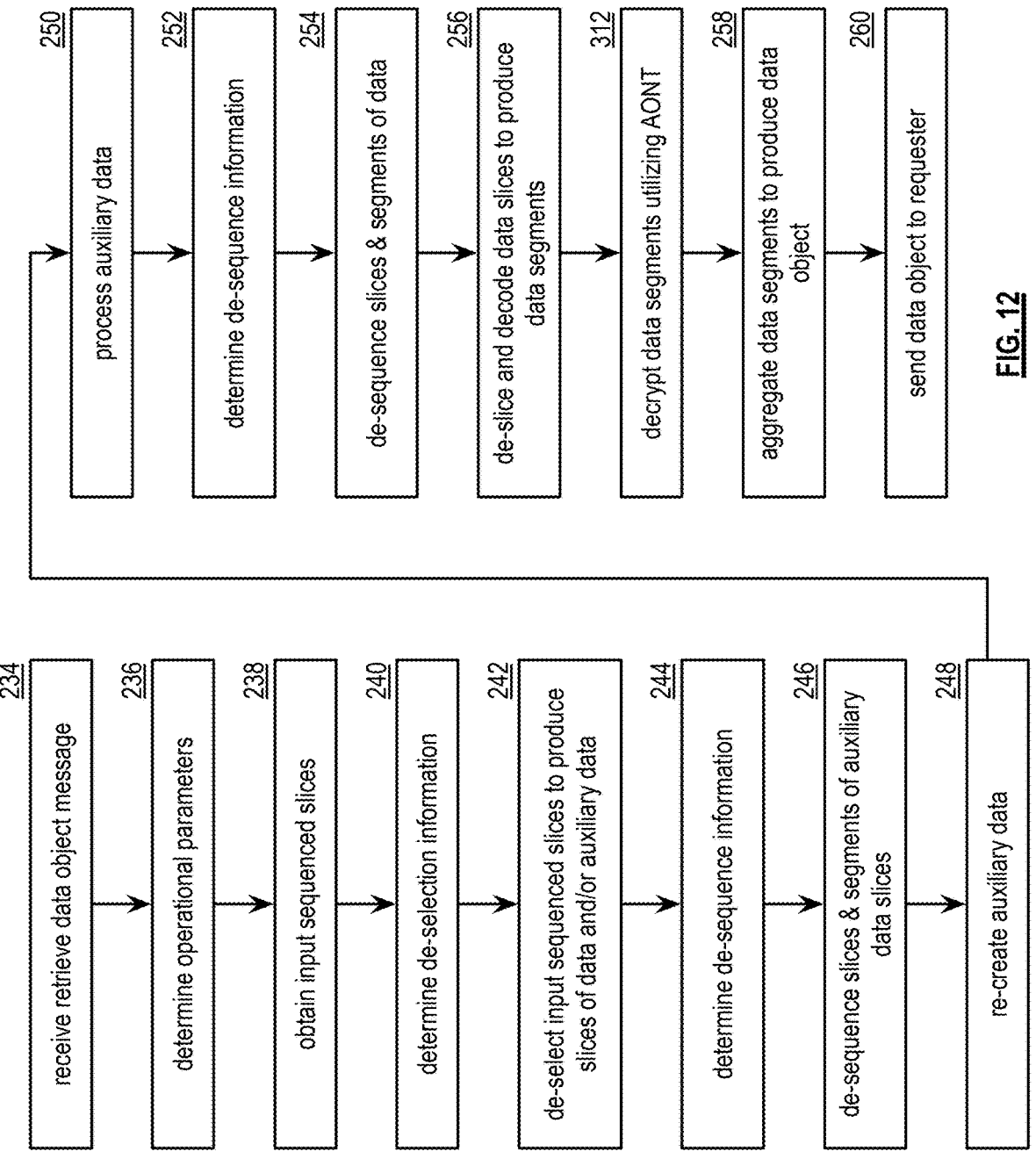
FIG. 12 is a flowchart illustrating another example of decoding encoded data slices to produce data in accordance with the invention.

FIG. 12 is another flowchart illustrating another example of decoding encoded data slices to produce data, which includes similar steps to the flowchart of FIG. 10. The method begins with steps 234-256 of FIG. 10 and then continues with step 312 where the processing module decrypts the encrypted data segments of step 256 to produce a plurality of data segments. The decrypting includes the complement of the encrypting function used to encrypt the data segments.

For example, if the data segments were encrypted using the AONT encryption method, the processing module utilizes the AONT method to decrypt the encrypted data segment packages. As a more specific example, the processing module uses the AONT method and a key (e.g., a random key) to decrypt each encrypted data segment based on the random key used to decrypt at least one encrypted auxiliary data segment associated with the auxiliary data. The method concludes with steps 258-260 of FIG. 10.

Figure 13:
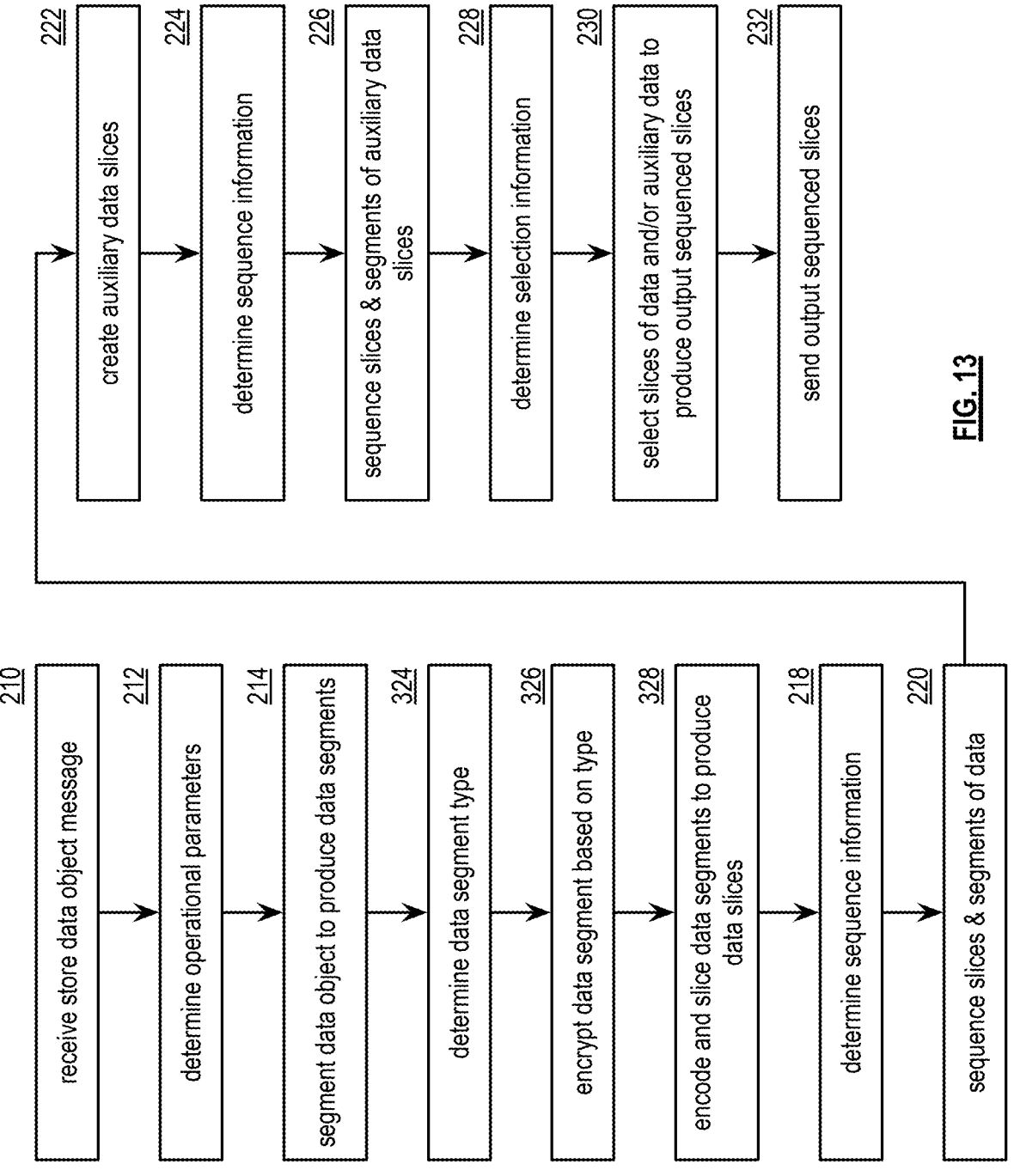
FIG. 13 is a flowchart illustrating another example of encoding data to produce encoded data slices in accordance with the invention.

FIG. 13 is another flowchart illustrating another example of encoding data to produce encoded data slices, which includes many similar steps to FIG. 9. The method begins with steps 210-214 of FIG. 9 and then continues with step 324 where the processing module determines a data segment type (e.g., content) of a data segment. The data segment type includes one or more of a file header, a video header, routing information, addressing information, compression information, source information, destination information, video, text, music, speech, audio, telemetry, control information, a command, a request, status information, a random number, a sequence seed, a key, a private key, a shared key, a secret key, a public key, and an image. Such a determination may be based on one or more of the data segment, a data segment type determination algorithm, the error coding dispersal storage function parameters, a requester identifier (ID), a vault lookup, a data object name, a data object, a data stream, sequence information, a key, a priority indicator, a security indicator, a command, a predetermination, a message, a performance indicator, and information received in the store data object message.

The method continues at step 326, where, in order of receiving the data segments, the processing module selects an encryption method based on the data type (e.g., data segment type) and encrypts the data segment using the selected encryption method to produce an encrypted data segment. Such a selection of the encryption method may be based on one or more of the data segment type, the data segment, an encryption method determination algorithm, the error coding dispersal storage function parameters, a requester ID, a vault lookup, a data object name, a data object, a data stream, sequence information, a key, a priority indicator, a security indicator, a command, a predetermination, a message, the performance indicator, and information received in the store data object message.

For example, the processing module encrypts the data segment utilizing an all or nothing transformation (AONT) encryption method when the data segment type indicates that the type is a video header and the security indicator indicates to encrypt video headers. In another example, the processing module determines not to encrypt the data segment when the data segment type indicates that the type is routine status information and the security indicator indicates to not encrypt routine status information. In another example, the processing module selects the encryption method to include encrypting the data segment utilizing a key based on a calculation of a hash value (e.g., secure hash function SHA-256, SHA-512 etc.) over a key of the day, a source user ID, and a current time value. The method concludes with steps 218-232 of FIG. 10.

Figure 14:
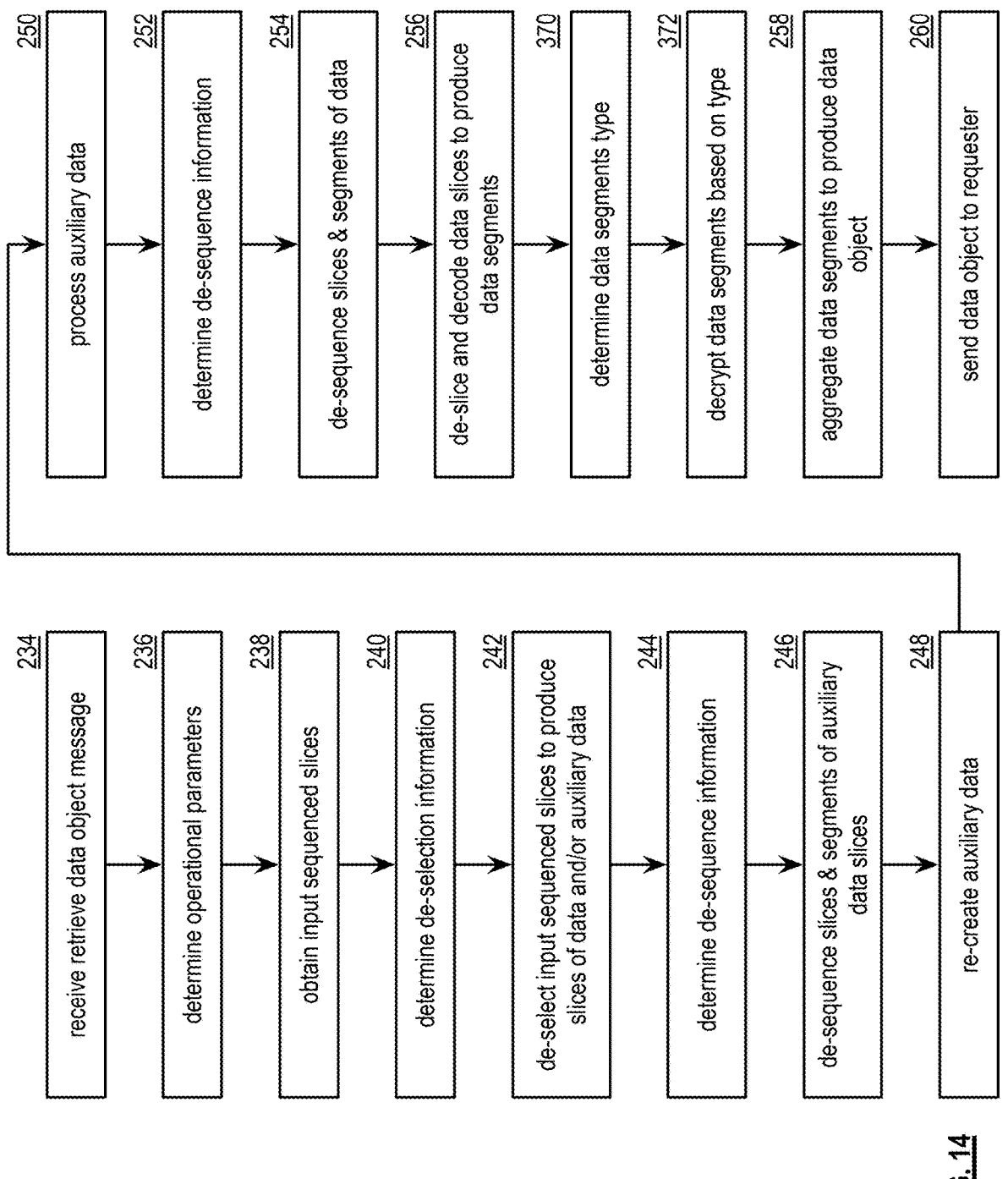
FIG. 14 is a flowchart illustrating another example of decoding encoded data slices to produce data in accordance with the invention.

FIG. 14 is another flowchart illustrating another example of decoding encoded data slices to produce data, which includes similar steps to the flowchart of FIG. 10. The method begins with steps 234-256 of FIG. 10 and then continues with step 370 where the processing module determines a data segment type of a data segment. The processing module may determine the data segment type based on one or more of the data segment type extracted from the auxiliary data, from the sets of encoded data slices, from the encrypted data segments, the encrypted data segment, a data segment type determination algorithm, the error coding dispersal storage function parameters, a requester ID, a vault lookup, a data object name, a data object, a data stream, sequence information, a key, a priority indicator, a security indicator, a command, a predetermination, a message, a performance indicator, and information received in the store data object message.

The method continues at step 372 where the processing module selects a decryption method based on the data segment type and decrypts the encrypted data segments utilizing the decryption method to produce the plurality of data segments. Note that the decryption method may vary from encrypted data segment to encrypted data segment. The method concludes with steps 258 and 260 of FIG. 10.

Figure 15:
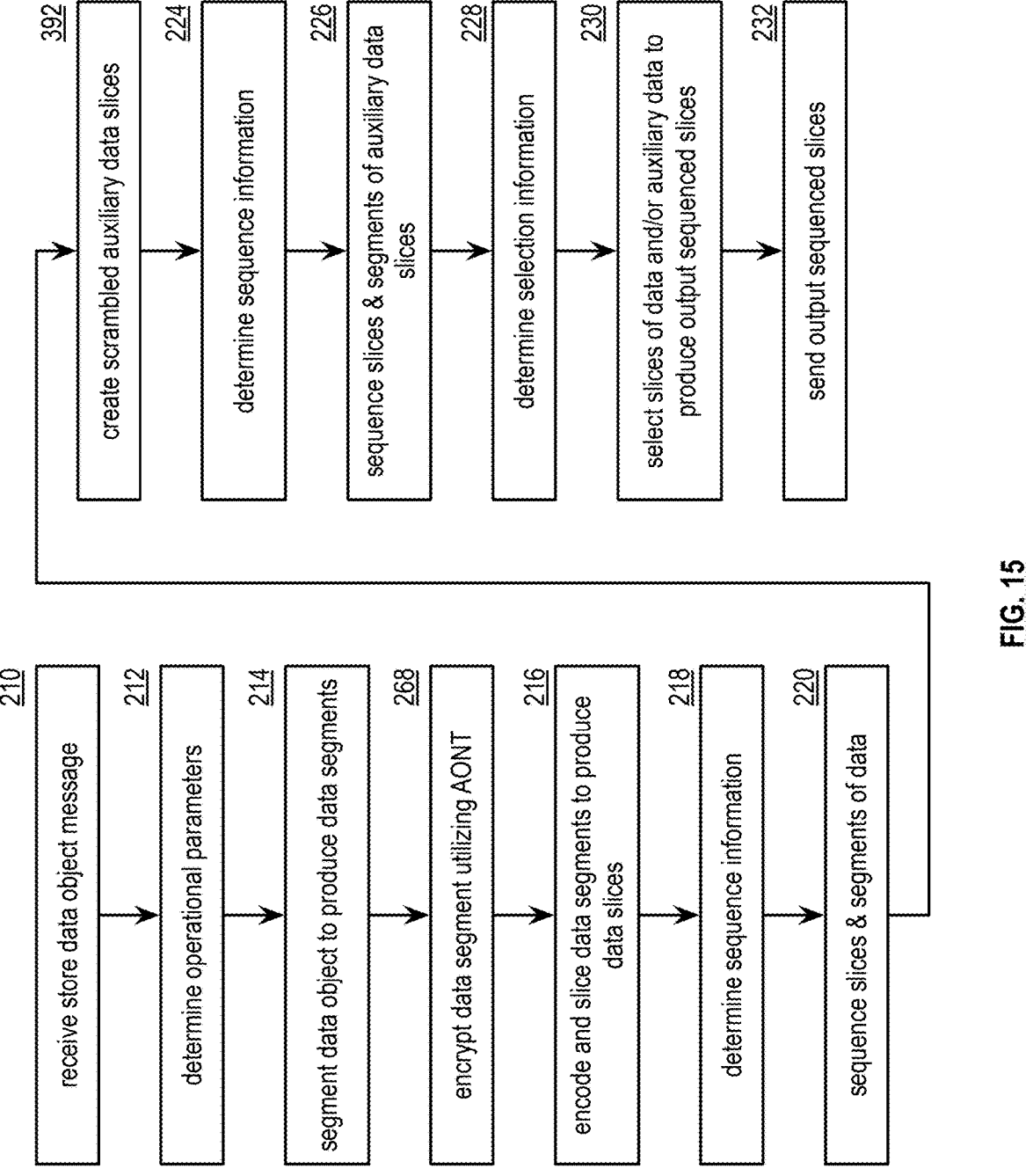
FIG. 15 is a flowchart illustrating another example of encoding data to produce encoded data slices in accordance with the invention.

FIG. 15 is another flowchart illustrating another example of encoding data to produce encoded data slices, which includes similar steps from the flowcharts of FIGS. 9 and 11. The method begins with steps 210-214 of FIG. 9, step 268 of FIG. 11, and steps 216-220 of FIG. 9. The method continues at step 392 where the processing module scrambles auxiliary data segments to produce scrambled auxiliary data segments utilizing a low processing utilization scrambling algorithm. The low processing utilization scrambling algorithm may include one or more of rearranging auxiliary data segment bits in accordance with a predetermined bit rearranging method, inverting all of the auxiliary data segment bits, inverting a portion of the auxiliary data segment bits in accordance with a predetermined method, and rearranging a portion of the auxiliary data segment bits in accordance with the predetermined bit rearranging method and inverting a portion of the auxiliary data segment bits in accordance with a predetermined bit inversion method. The processing module then dispersed storage error encodes the scrambled auxiliary data segments to produce encoded auxiliary data slices in accordance with auxiliary error coding dispersal storage function parameters as previously discussed. The method concludes with steps 224-232 of FIG. 9.

FIG. 16 is another flowchart illustrating another example of decoding encoded data slices to produce data, which includes similar steps from the flowcharts of FIGS. 10 and 12. The method begins with steps 234-246 of FIG. 10 and continues with step 418 where the processing module dispersed storage error decodes the de-sequenced encoded auxiliary data slices to produce scrambled auxiliary data segments. The processing module de-scrambles (e.g., the compliment of the scrambling) the scrambled auxiliary data segments to produce auxiliary data segments in accordance with a de-scrambling algorithm. The processing module aggregates the auxiliary data segments to produce the auxiliary data. The method concludes with steps 250-256 of FIG. 10, step 312 of FIG. 12, and steps 258-260 of FIG. 10.

Figure 17:
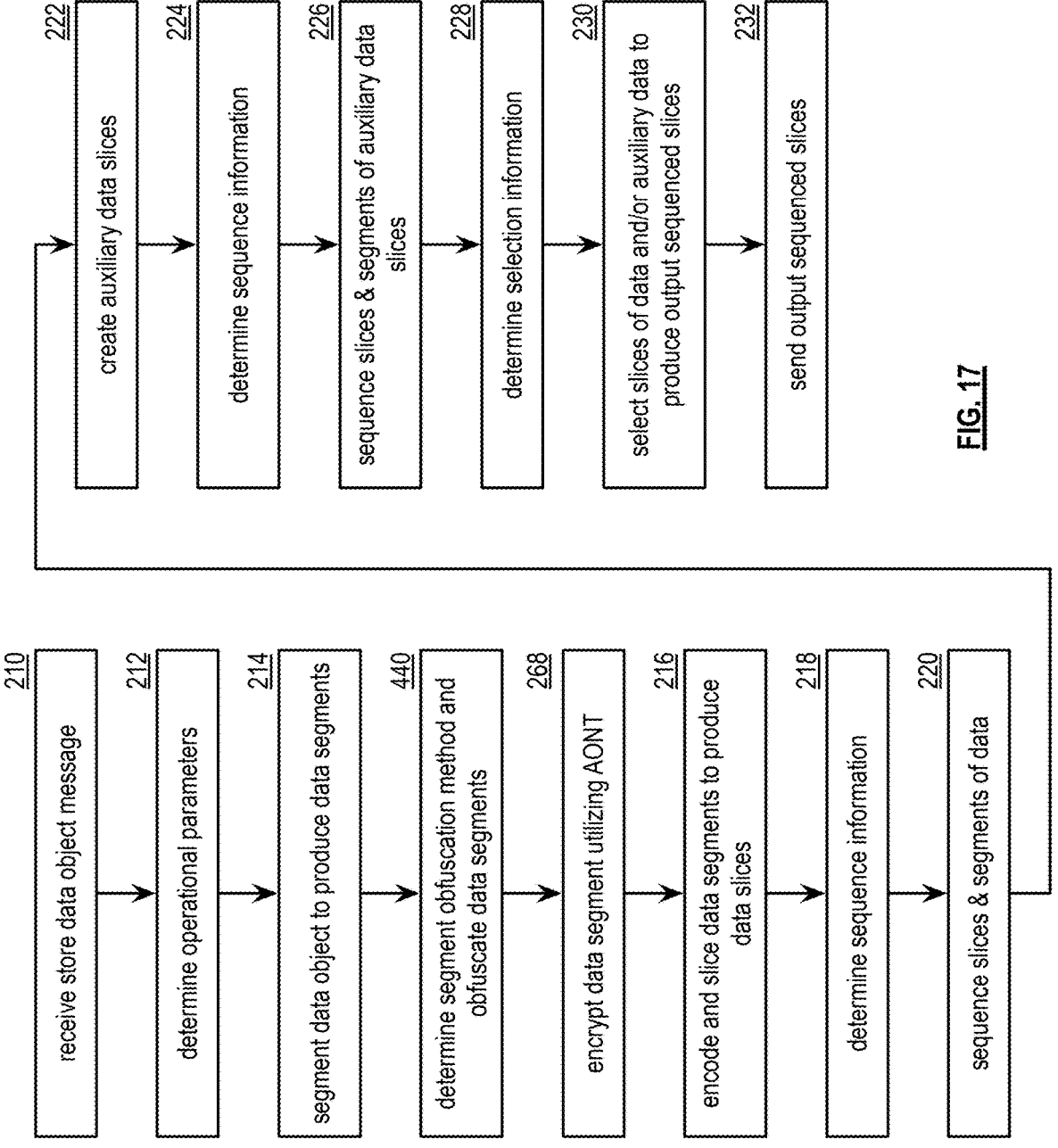
FIG. 17 is a flowchart illustrating another example of encoding data to produce encoded data slices in accordance with the invention.

FIG. 17 is another flowchart illustrating another example of encoding data to produce encoded data slices, which includes similar steps from the flowcharts of FIGS. 9 and 11. The method begins with steps 210-214 of FIG. 9 and continues at step 440 where the processing module determines an obfuscating method based on one or more of the error coding dispersal storage functions parameters, a requester identifier (ID), a vault lookup, a data object name, a data object, a data stream, sequence information, a key, a priority indicator, a security indicator, a command, a predetermination, a message, information in the store data object message, and a performance indicator. The obfuscating method may include one or more of adding random bits (e.g., creation of a new data segment that contains all of the bits of at least one receive data segment of the received data segments and new random bits), inverting bits of the received data segment, and replacing a portion of the bits of the received data segment with bits produced from a obfuscation calculation based on the portion of bits of the received data segment (e.g., a logical XOR of the data segment bits with a key). The method concludes with step 268 of FIG. 11 and sets 216-232 of FIG. 9.

FIG. 18 is another flowchart illustrating another example of decoding encoded data slices to produce data, which includes similar steps from the flowcharts of FIGS. 10 and 12. The method begins with steps 234-256 of FIG. 10 and step 312 of FIG. 12. The method continues at step 488 where the processing module determines a de-obfuscating method (e.g., the compliment of the obfuscating method). The processing module may determine the de-obfuscating method may be based on one or more of the error coding dispersal storage function parameters, a requester identifier (ID), a vault lookup, a data object name, a data object, a data stream, sequence information, a key, a priority indicator, a security indicator, a command, a predetermination, a message, information in the store data object message, and a performance indicator. The method concludes with steps 258-260 of FIG. 10.

Figure 19:
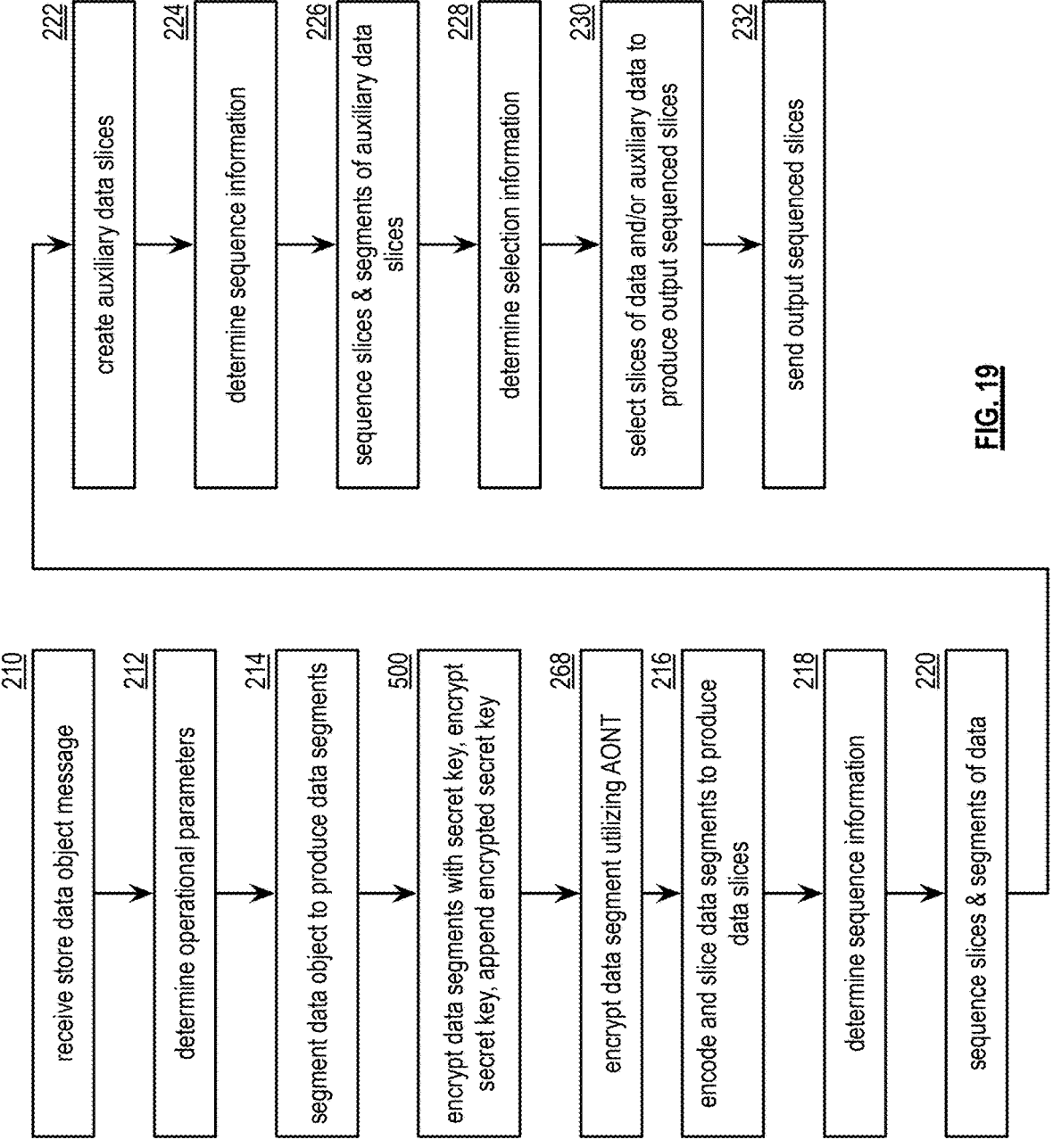
FIG. 19 is a flowchart illustrating another example of encoding data to produce encoded data slices in accordance with the invention.

FIG. 19 is another flowchart illustrating another example of encoding data to produce encoded data slices, which includes similar steps from the flowcharts of FIGS. 9 and 11. The method begins with steps 210-214 of FIG. 9 and continues at step 500 where the processing module determines a secret key. Such a determination may be based on one or more of retrieval from a memory, a list, a lookup, a command, a message, a predetermination, and a calculation. Note that the processing module may determine a secret key for each data segment of the received data segments. In an example, the processing module calculates the secret key by hashing a key of the day, a user device identifier (ID), and a current date value.

The processing module encrypts the data segment in accordance with encryption algorithm utilizing the secret key to produce an encrypted data segment as a data segment of the received data segments. The processing module may determine a second key based on one or more of retrieval from a memory, a list, a lookup, a command, a message, a predetermination, and a calculation. For example, the processing module determines the second key as a public key from a lookup subsequent to receiving the public key and storing it in a memory. The processing module encrypts the secret key in accordance with the error coding dispersal storage option parameters utilizing the second key to produce an encrypted secret key and appends the encrypted secret key to an associated encrypted data segment and/or to one or more encoded data slices of the associated encrypted data segment. The method concludes with step 268 of FIG. 11 and steps 216-232 of FIG. 9.

Figure 20:
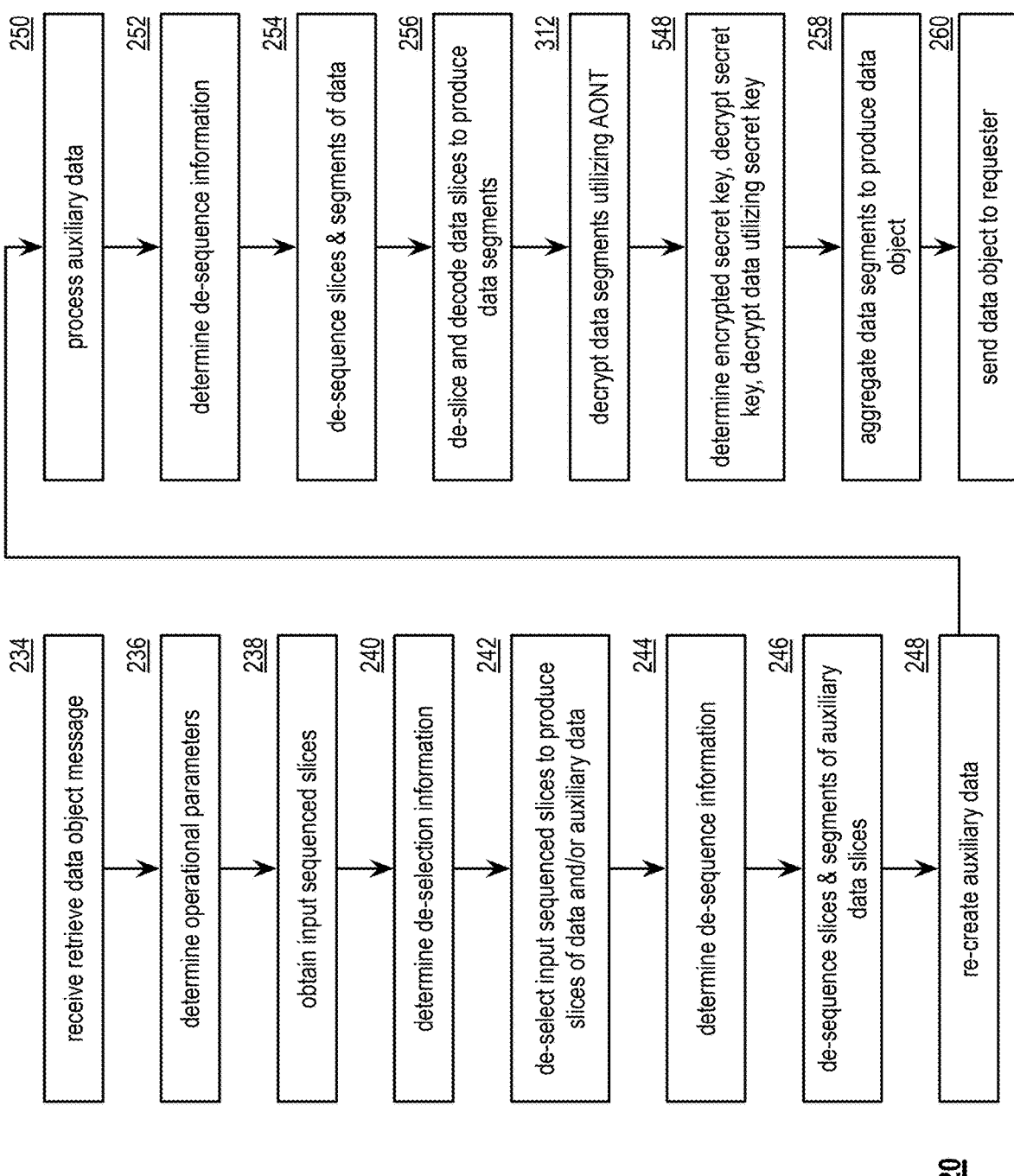
FIG. 20 is a flowchart illustrating another example of decoding encoded data slices to produce data in accordance with the invention.

FIG. 20 is another flowchart illustrating another example of decoding encoded data slices to produce data, which includes similar steps from the flowcharts of FIGS. 10 and 12. The method begins with steps 234-256 of FIG. 10 and step 312 of FIG. 12. The method continues at step 548 where the processing module extracts an encrypted secret key from the encrypted data segment and/or from at least one of the encoded data slices of the encrypted data segment. The processing module determines a second key based on one or more of a retrieval from a memory, a list, a lookup, a command, a message, a predetermination, and a calculation.

The processing module decrypts the encrypted secret key in accordance with the error coding dispersal storage function parameters (e.g., a specified decryption algorithm) utilizing the second key to produce a received secret key. The processing module determines a secret key based on one or more of the received secret key, retrieval from a memory, a list, a lookup, a command, a message, a predetermination, and a calculation. The processing module decrypts each of the further encrypted data segment (e.g., after the AONT method) in accordance with the error coding dispersal storage function parameters (e.g., a decryption algorithm) utilizing the corresponding secret key. The method concludes with steps 258-260 of FIG. 10.

Figure 21:
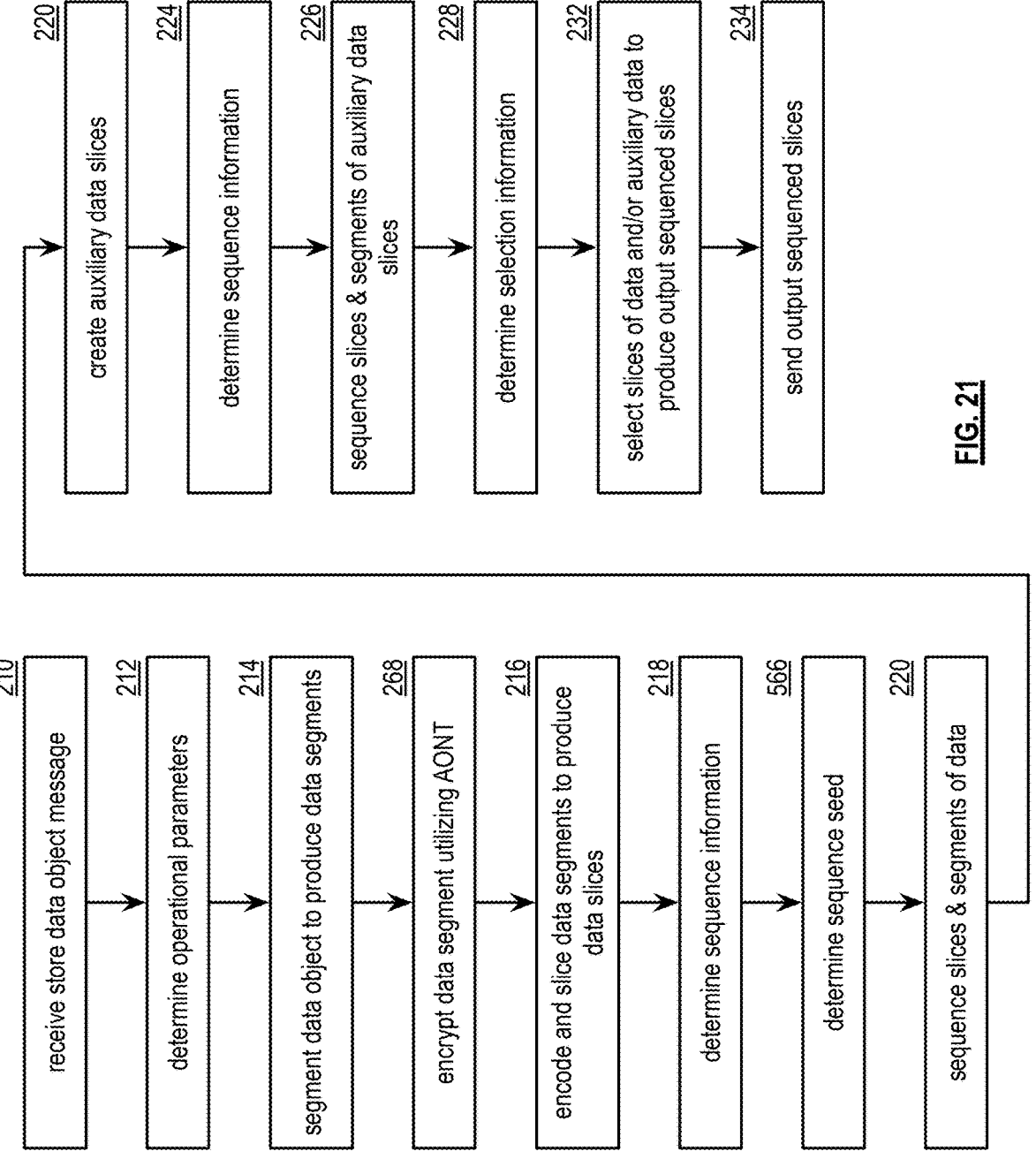
FIG. 21 is a flowchart illustrating another example of encoding data to produce encoded data slices in accordance with the invention.

FIG. 21 is another flowchart illustrating another example of encoding data to produce encoded data slices, which includes similar steps from the flowcharts of FIGS. 9 and 11. The method begins with steps 210-214 of FIG. 9, step 268 of FIG. 11, and steps 216-218 of FIG. 9. The method continues at step 566 where the processing module determines a sequence seed based on one or more of the sequence information, a seed generation algorithm, a hash function, a received key, a stored key, a calculated key, a data type (e.g., video, audio, telemetry, commands, status information, etc.), a requester identifier (ID), a vault lookup, a data object name, a data object, a data stream, received sequence information (e.g., part of the request message), the error coding dispersal storage function parameters, information received in the store data object request message, a calculation, a priority indicator, a security indicator, a list, a command, a predetermination, a message, a previous seed, a last seed, a previous seed, and a performance indicator. For example, the processing module determines the sequence seed to include a calculated (e.g., hash) value of 1F46D8EA39B based on a hash over a source user device 5F02D77B, a key 34D8AB90, a sequence algorithm 3AC, and a video data type. The method concludes with steps 220-234 of FIG. 9.

FIG. 22 is another flowchart illustrating another example of decoding encoded data slices to produce data, which includes similar steps from the flowcharts of FIGS. 10 and 12. The method begins with steps 234-252 of FIG. 10 and continues at step 602 where the processing module determines a de-sequence seed based on one or more of the de-sequence information, a seed generation algorithm, a hash function, a received key, a stored key, a calculated key, a data type (e.g., video, audio, telemetry, commands, status information, etc.), a requester identifier (ID), a vault lookup, a data object name, auxiliary data, a received sequence information (e.g., part of the request message), the error coding dispersal storage function parameters, information received in the retrieve data object request message, a calculation, a priority indicator, a security indicator, a list, a command, a predetermination, a message, a previous seed, a last seed, and a performance indicator. For example, the processing module determines the de-sequence seed to include a calculated (e.g., hash) value of 1F46D8EA39B based on a hash over a source user device 5F02D77B, a key 34D8AB90, a sequence algorithm 3AC, and a video data type.

The method continues at step 254 where the processing module orders the encoded data slices based on a pseudo-random de-sequencing order using the de-sequence seed. The method concludes with step 256 of FIG. 10, 312 of FIG. 12 and steps 258-260 of FIG. 10.

Figure 23:
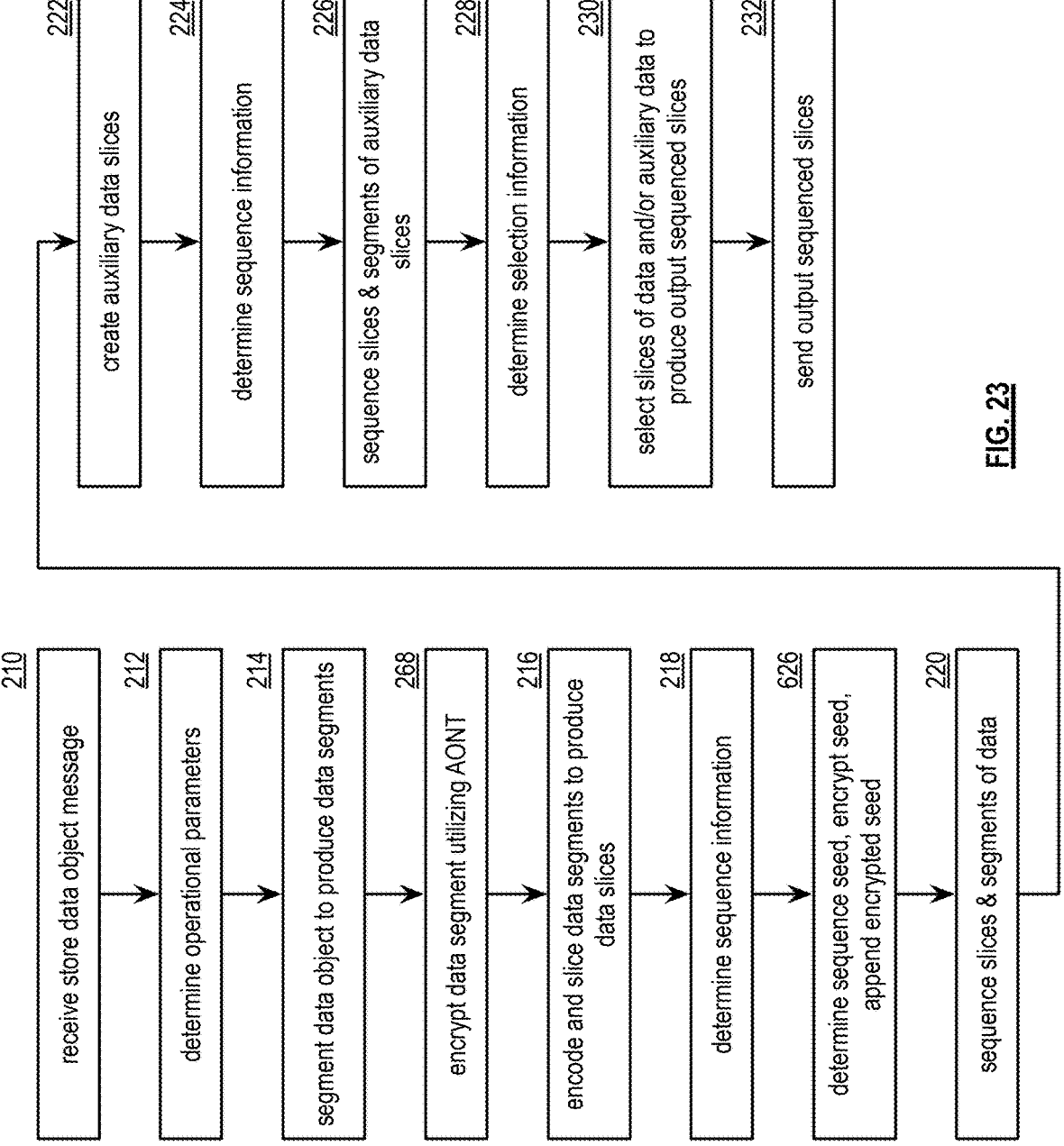
FIG. 23 is a flowchart illustrating another example of encoding data to produce encoded data slices in accordance with the invention.

FIG. 23 is another flowchart illustrating another example of encoding data to produce encoded data slices, which includes similar steps from the flowcharts of FIGS. 9 and 11. The method begins with steps 210-214 of FIG. 9, step 268 of FIG. 11, and steps 216-218 of FIG. 9. The method continues at step 626 where the processing module determines a sequence seed, an encryption key or seed, which it appends to one or more data segments. In this step, the processing module encrypts the sequence seed utilizing the encryption key to produce an encrypted sequence seed. Note that the encryption key may be varied from data segment to data segment. Alternatively, or in addition to, the processing module may include the sequence seed as data of the auxiliary data. The method concludes with steps 220-232 of FIG. 9.

Figure 24:
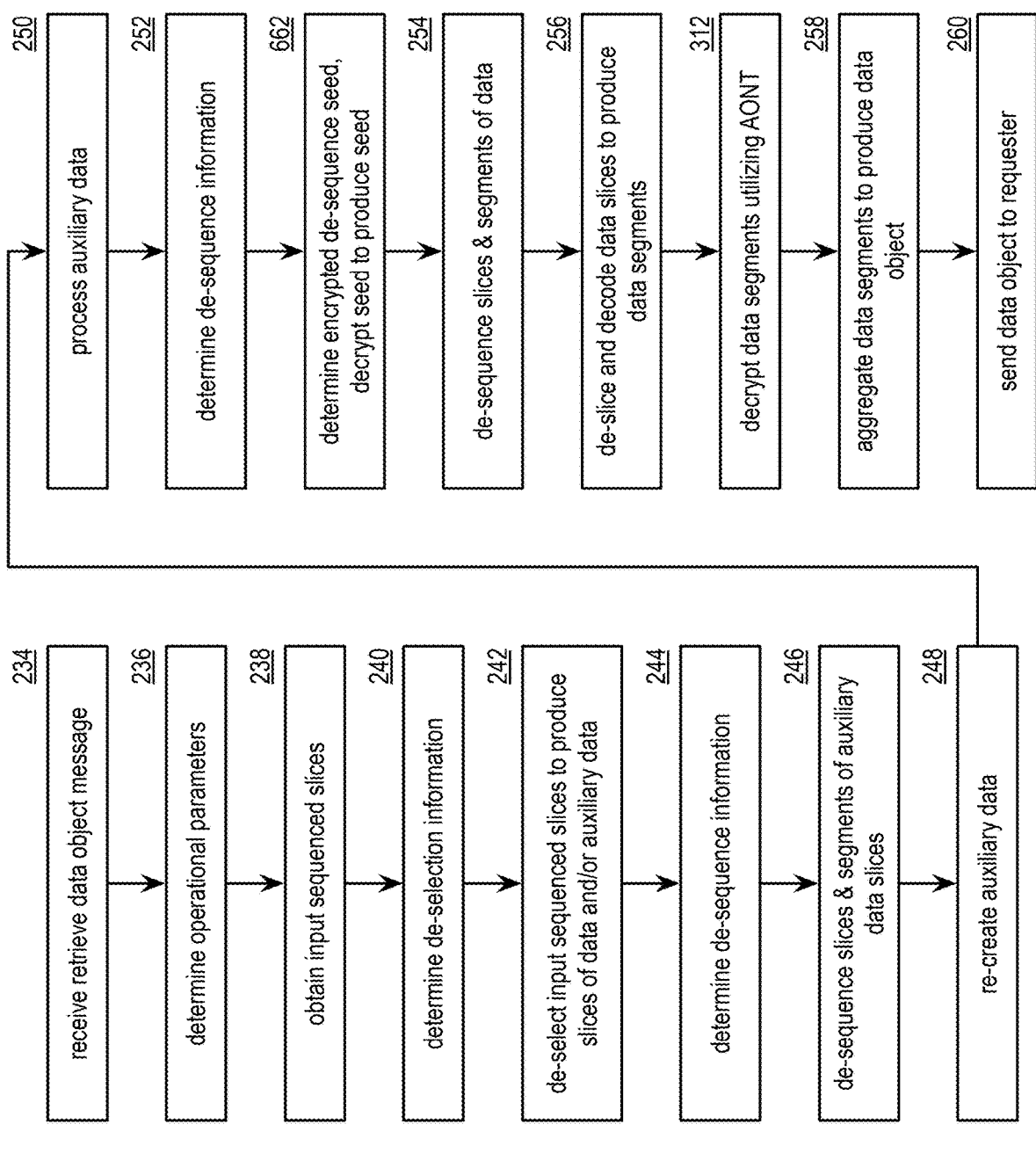
FIG. 24 is a flowchart illustrating another example of decoding encoded data slices to produce data in accordance with the invention.

FIG. 24 is another flowchart illustrating another example of decoding encoded data slices to produce data, which includes similar steps from the flowcharts of FIGS. 10 and 12. The method begins with steps 234-252 of FIG. 10 and continues at step 662 where the processing module extracts an appended encrypted sequence seed from one or more of a auxiliary data segment, and encoded auxiliary data slice, and an encoded and sliced to produce an encrypted de-sequence seed. The processing module decrypts the encrypted de-sequence seed in accordance utilizing a private key (e.g., of a public/private key pair of an associated destination user device) to produce a decrypted de-sequence seed. In an example, the processing module determines the de-sequence seed to include a value of 1F46D8EA39B based on the decrypted de-sequence seed. In another example, the processing module determines the de-sequence seed to include a calculated (e.g., hash) value of 1F46D8EA39B based on a hash over a source user device 5F02D77B, a key 34D8AB90, a sequence algorithm 3AC, and a video data type.

The method continues at step 254 where the processing module orders the encoded data slices based on a pseudo-random de-sequencing order utilizing the de-sequence seed. The method concludes with step 256 of FIG. 10, step 312 of FIG. 12, and steps 258-260 of FIG. 10.

Figure 25:
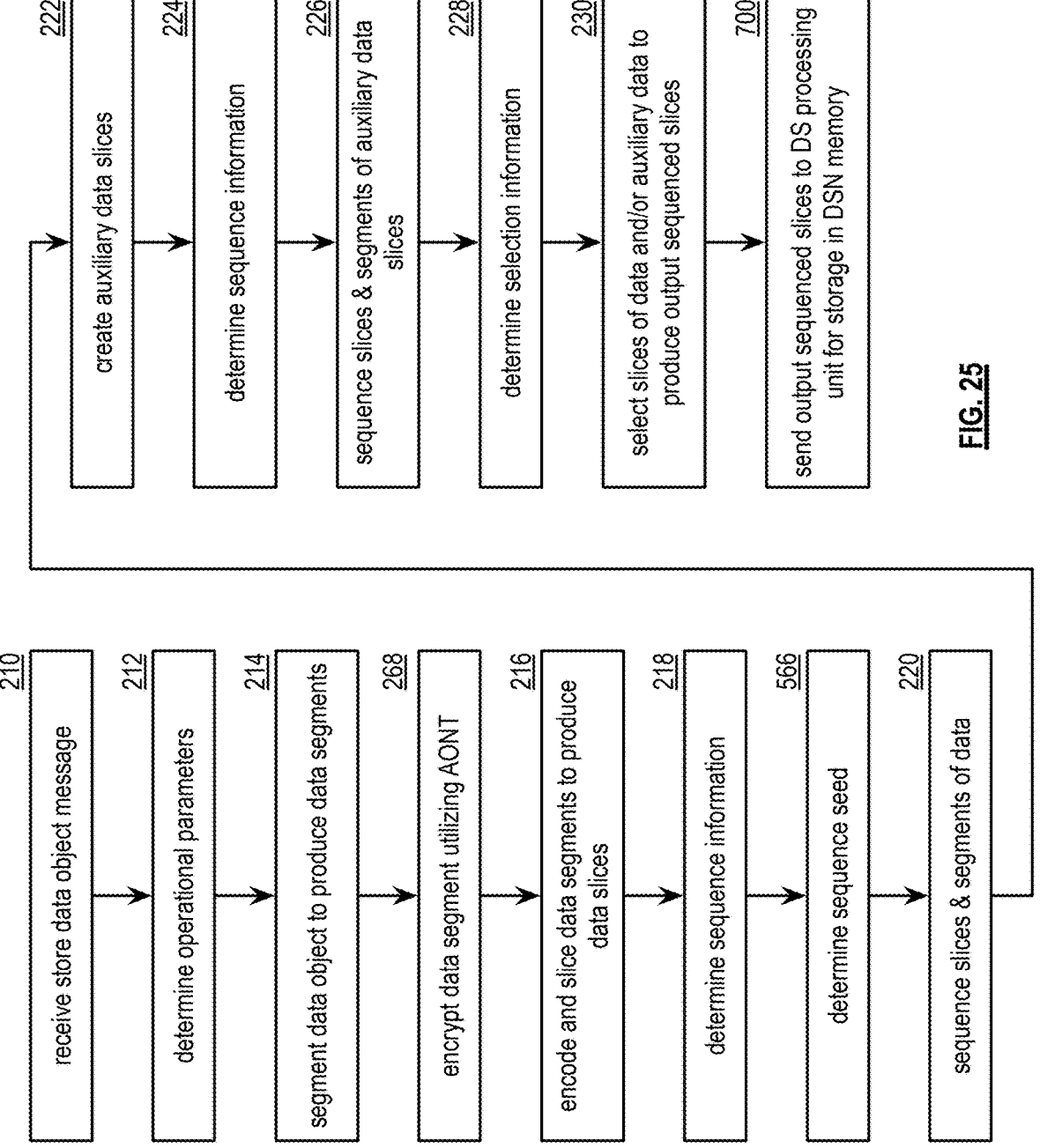
FIG. 25 is a flowchart illustrating another example of encoding data to produce encoded data slices in accordance with the invention.

FIG. 25 is another flowchart illustrating another example of encoding data to produce encoded data slices, which includes similar steps from the flowcharts of FIGS. 9, 11, and 21. The method begins with steps 210-214 of FIG. 9, step 268 of FIG. 11, steps 216-218 of FIG. 9, step 566 of FIG. 21, and steps 220-230 of FIG. 9. The method continues at step 700 where processing module sends the output sequenced slices to a dispersed storage (DS) processing unit (e.g., that may have requested slices and that may have provided a sequence seed and other information) for storage in at least one dispersed storage network (DSN) memory. In an example, the processing module sends first buffered encoded data slices and, at most, some second buffered encoded data slices of second buffered encoded data slices to the DSN memory for storage therein. Note that the output sequenced slices may be communicated from the source user device to the DS processing unit via one or more wireless modules utilizing wireless signals.

Figure 26:
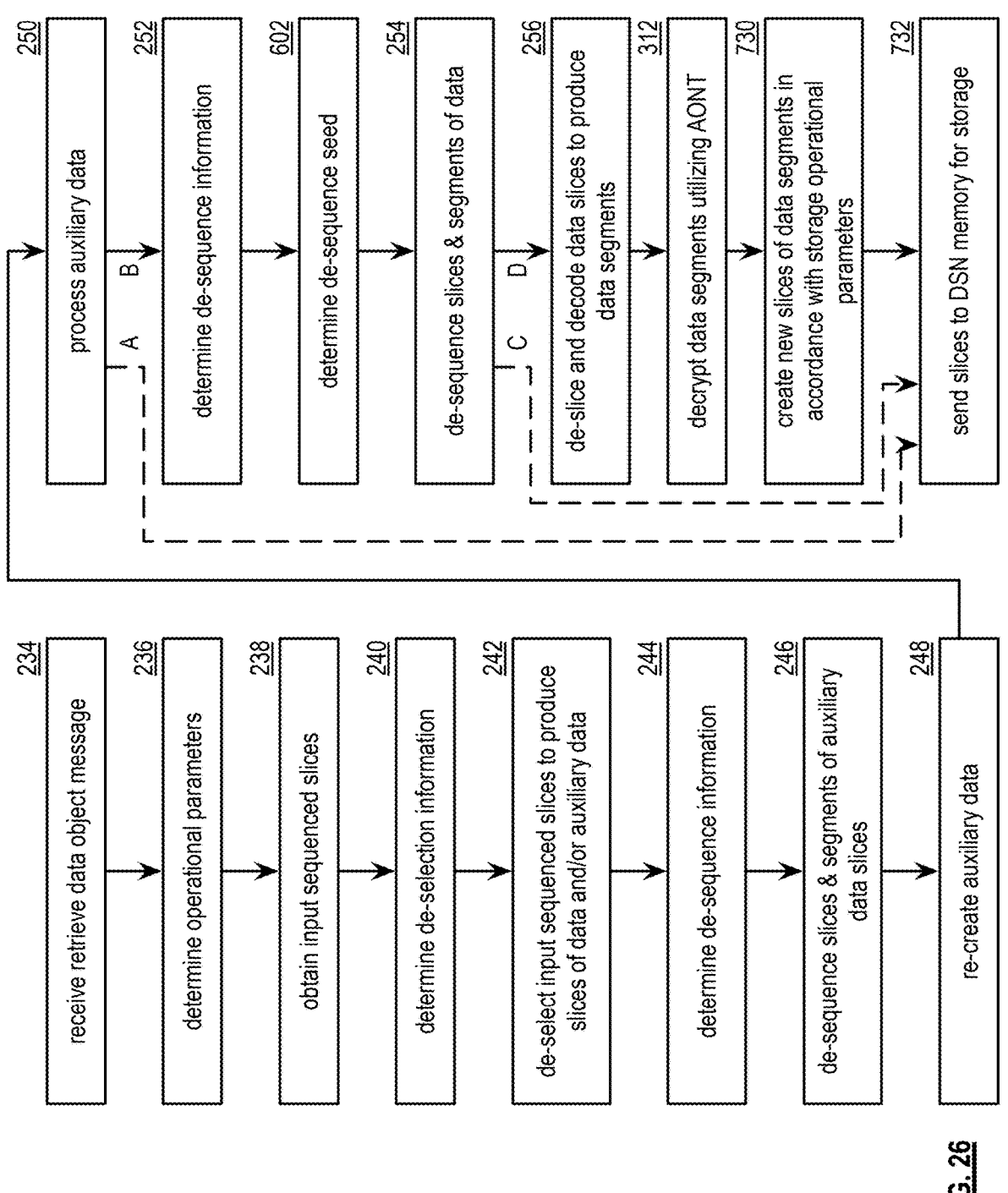
FIG. 26 is a flowchart illustrating another example of decoding encoded data slices to produce data in accordance with the invention.

FIG. 26 is another flowchart illustrating another example of decoding encoded data slices to produce data, which includes similar steps from the flowcharts of FIGS. 10, 12, and 22. The method begins with steps 234-252 of FIG. 10, step 602 of FIG. 22, steps 254-256 of FIG. 9, and step 312 of FIG. 12. The method continues at step 730 where the processing module aggregates the plurality of data segments to produce a data stream or data object and determines second error coding dispersal storage function parameters based on one or more of information in the retrieve data object message, a user device ID, a DS processing unit ID, a vault lookup, a predetermination, a command, and a message. The processing module dispersed storage error and codes the data stream or data object to produce a plurality of sets of re-encoded data slices in accordance with the second error coding dispersal storage parameters.

The method continues at step 732 where the processing module sends slices to the DSN memory for storage therein in accordance with the slice storage format. For example, the processing module sends the obtained encoded data slices to the DSN memory for storage therein when the processing module determines that the slice storage format includes storing information in the format of the obtained encoded data slices (e.g., path A). In another example, the processing module sends the plurality of sets of encoded data slices to the DSN memory for storage therein when the processing module determines that the slice storage format includes storing information in the format of the plurality of the encoded data slices (e.g., path C). In another example, the processing module dispersed storage error encodes the plurality of data segments to produce the plurality of sets of re-encoded data slices and sends the plurality of sets of re-encoded data slices to the DSN memory for storage therein when the processing module determines that the slice storage format includes storing information in the format of re-encoded data slices.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for execution by one or more computing devices of a storage network, the method comprises:
   de-selecting a sequence of input encoded data slices based on de-selection information to produce deselected encoded data slices of a set of encoded data slices, wherein the input encoded data slices include the set of encoded data slices interspersed with a set of auxiliary data slices;
   de-sequencing a random sequence of the deselected encoded data slices to produce an ordered sequence of at least a decode threshold number of encoded data slices;
   error decoding the ordered sequence of the at least the decode threshold number of encoded data slices of the deselected encoded data slices in accordance with error decoding parameters to reproduce a data segment; and
   outputting the data segment to a requesting computing device of the storage network.

2. The method of claim 1 further comprises:
   obtaining the input encoded data slices from memory of the storage network.

3. The method of claim 1 further comprises:
   error encoding a data segment into the set of encoded data slices in accordance with error coding parameters.

4. The method of claim 1 further comprises:
   error encoding auxiliary data into the set of auxiliary data slices in accordance with auxiliary encoding parameters.

5. The method of claim 1 further comprises:
   de-selecting the sequence of input encoded data slices based on the de-selection information to produce the set of auxiliary data slices; and
   error decoding the auxiliary data slices in accordance with auxiliary decoding parameters to reproduce the auxiliary data.

6. The method of claim 5, wherein the auxiliary decoding parameters are the same as the error decoding parameters.

7. The method of claim 3 further comprises:
   determining the deselected encoded data slices are in a random sequence based on the auxiliary data;
   wherein the auxiliary data comprises identity of the random sequence.

8. The method of claim 3 further comprises:
   determining the data segment is an encrypted data segment based on the auxiliary data; and
   decrypting the encrypted data segment utilizing a decryption key to produce the data segment, wherein the auxiliary data includes an identity of the decryption key.

9. The method of claim 1 further comprises:
   obtaining operational parameters for the input encoded data slices; and
   determining the error decoding parameters for the error decoding the at least the decode threshold number of encoded data slices based on the operational parameters.

10. The method of claim 1 further comprises:
   obtaining the de-selection information by performing a lookup.

11. The method of claim 1, wherein the de-selection information includes an identifier of a de-selection algorithm.

12. The method of claim 1, wherein the set of auxiliary data slices, when reconstructed as auxiliary data, comprises at least one of:
   null data;
   authentication information;
   a next pseudo random output sequencing order;
   a pseudo random output sequencing order identifier;
   a next outputting threshold;
   a random number generator output;
   an encryption key;
   a starting point for the pseudo random output sequencing order;
   a device identifier;
   a data identifier;
   a data type;
   a data size indicator;
   a priority indicator;
   a security indicator; or
   a performance indicator.

13. A computing device of a storage network, the computing device comprises:
   memory;
   an interface; and
   at least one processing module operably coupled to the memory and the interface,
   wherein the processing module is operable to:
   de-select a sequence of input encoded data slices based on de-selection information to produce deselected encoded data slices of a set of encoded data slices, wherein the input encoded data slices include the set of encoded data slices interspersed with a set of auxiliary data slices;
   de-sequence a random sequence of the deselected encoded data slices to produce an ordered sequence of at least a decode threshold number of encoded data slices;
   error decode the ordered sequence of the at least the decode threshold number of encoded data slices of the deselected encoded data slices in accordance with error decoding parameters to reproduce a data segment; and
   outputting the data segment to a requesting computing device of the storage network.

14. The computing device of claim 13 further comprises:
   obtaining the input encoded data slices from memory of the storage network.

15. The computing device of claim 13 further comprises:
   error encoding a data segment into the set of encoded data slices in accordance with error coding parameters.

16. The computing device of claim 13 further comprises:
   error encoding auxiliary data into the set of auxiliary data slices in accordance with auxiliary encoding parameters.

17. The computing device of claim 16 further comprises:
   de-selecting the sequence of input encoded data slices based on the de-selection information to produce the set of auxiliary data slices; and
   error decoding the auxiliary data slices in accordance with auxiliary decoding parameters to reproduce the auxiliary data.

18. The computing device of claim 17, wherein the auxiliary decoding parameters are the same as the error decoding parameters.

19. The computing device of claim 16 further comprises:

determining the deselected encoded data slices are in a
random sequence based on the auxiliary data;

wherein the auxiliary data comprises identity of the
random sequence.

20. The computing device of claim 16 further comprises:

determining the data segment is an encrypted data seg-
ment based on the auxiliary data; and decrypting the encrypted data segment utilizing a decryp-
tion key to produce the data segment, wherein the
auxiliary data includes an identity of the decryption
key.

* * * * *